(12) United States Patent
Misra et al.

(10) Patent No.: US 11,972,251 B2
(45) Date of Patent: Apr. 30, 2024

(54) CONTINUOUS LEARNING-BASED APPLICATION RELATED TRADE-OFF RESOLUTION AND IMPLEMENTATION

(71) Applicant: ACCENTURE GLOBAL SOLUTIONS LIMITED, Dublin (IE)

(72) Inventors: Janardan Misra, Bangalore (IN); Vikrant Kaulgud, Pune (IN); Adam Patten Burden, Singapore (SG); Sanjay Podder, Thane (IN); Narendranath Sukhavasi, Nizamabad (IN); Nibedita Sarmah, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 185 days.

(21) Appl. No.: 17/236,841

(22) Filed: Apr. 21, 2021

(65) Prior Publication Data

US 2021/0334090 A1     Oct. 28, 2021

(30) Foreign Application Priority Data

Apr. 25, 2020  (IN) ............................ 202011017756
Jul. 16, 2020  (IN) ............................ 202011030399

(51) Int. Cl.
*G06F 9/44*     (2018.01)
*G06F 8/70*     (2018.01)
(Continued)

(52) U.S. Cl.
CPC ............... *G06F 8/70* (2013.01); *G06N 5/01* (2023.01); *G06N 20/00* (2019.01)

(58) Field of Classification Search
None
See application file for complete search history.

(56) References Cited

U.S. PATENT DOCUMENTS 6,662,357 B1 * 12/2003 Bowman-Amuah ..... G06F 8/20
                                                                717/120
2017/0213280 A1 * 7/2017 Kaznady ................ G06N 20/00
(Continued)

OTHER PUBLICATIONS

Pingle, Selection of obsolescence resolution strategy based on a multi criteria decision model (Year: 2015).*
(Continued)

*Primary Examiner* — Insun Kang
(74) *Attorney, Agent, or Firm* — Mannava & Kang, P.C.

(57) ABSTRACT

In some examples, continuous learning-based application related trade-off resolution and implementation may include generating, based on a plurality of historical tradeoff instances, an application feature matrix. Further, association rules for historical tradeoff instances for which decisions are not known, and a decision tree for historical tradeoff instances for which decisions are known may be generated. Decision rules may be induced, and default rules may be applied to a cold start scenario. The decision rules and the default rules may be refined to generate refined rules, and a confidence level may be determined for the refined rules. The refined rules may be prioritized based on the confidence level and applied to a new tradeoff instance to generate a resolution associated with the new tradeoff instance. The resolution may be implemented with respect to the new tradeoff instance.

8 Claims, 18 Drawing Sheets

(51) Int. Cl.
   G06N 5/01    (2023.01)
   G06N 20/00   (2019.01)

(56) References Cited

U.S. PATENT DOCUMENTS

| | | | | |
|---|---|---|---|---|
| 2019/0279097 | A1* | 9/2019 | Baines | G06N 20/20 |
| 2020/0092178 | A1* | 3/2020 | Nelson | G06F 9/5072 |
| 2020/0097846 | A1* | 3/2020 | Muramoto | G06F 9/451 |
| 2021/0110293 | A1* | 4/2021 | Lehr | G06N 20/00 |
| 2021/0133515 | A1* | 5/2021 | Biswas | G06N 20/00 |
| 2021/0150372 | A1* | 5/2021 | Jiang | G06N 20/20 |
| 2022/0222675 | A1* | 7/2022 | Sandepudi | G06N 5/025 |

OTHER PUBLICATIONS

Farhad Daneshgar et al., "An investigation of 'build vs. buy' decision for software acquisition by small to medium enterprises", Information and Software Technology, vol. 55, Issue 10, Oct. 2013, pp. 1741-1750.

Kai Petersen et al., "Choosing Component Origins for Software Intensive Systems: In-house, COTS, OSS, Outsourcing or Services?—A Case Survey", IEEE Transactions on Software Engineering, 39(12), Feb. 20, 2018, 19 pages.

Patrick Hung et al., "Factors affecting the buy vs build decision in large Australian organisations", Journal of Information Technology (2008) 23, pp. 118-131, published online May 15, 2007.

Deepika Badampudi et al., "Software component decision-making: In-house, OSS, COTS or outsourcing—A systematic literature review", The Journal of System and Software 121 (2016), pp. 105-124.

Richard Watson et al., "Decision Point for the Build vs. Buy Software Sourcing Decision", Gartner Inc., Technical Professional Advice, Jul. 3, 2012, 54 pages.

Panagiota Chatzipetrou et al., "Component selection in Software Engineering—Which attributes are the most important in the decision process?", 2018 44th Euromicro Conference on Software Engineering and Advanced Applications, pp. 198-205.

Basit Shahzad et al., "Build Software or Buy: A Study on Developing Large Scale Software", IEEE Access, Nov. 28, 2017, 13 pages.

KC Karnes, "Build vs. Buy: Developing The Big Picture Approach", CleverTap, downloaded on the Internet on Jan. 25, 2022, 17 pages. <https://clevertap.com/blog/build-vs-buy/>.

Collin Rusk, "How to Reduce Arguments in the Build-Vs-Buy Debate", Oct. 23, 2018, 4 pages.

Justin Baker, "The 6 Step Build vs Buy Model for Developers", HackerNoon.com, Oct. 2, 2017, 9 pages.

SentinelOne, "The Build vs Buy Decision Tree", May 1, 2018, 10 pages. <https://www.sentinelone.com/blog/build-vs-buy/>.

Michael Marsiglia, "Should You Build New Software or Buy It?—It Comes Down to Cost vs. Control", Atomic Object, Feb. 28, 2019, 4 pages. <https://spin.atomicobject.com/2019/02/28/software-build-vs-buy-decision/?nowprocket=1>.

Irfan Ahmed, "The Dilemma of Build vs Buy", Astera, Jul. 20, 2020, 6 pages. <https://www.astera.com/type/blog/dilemma-build-vs-buy-enterprise-software/>.

Nikhil Hasija, "Buy vs. Build: Integration Software", Mar. 21, 2017, 7 pages. <https://www.linkedin.com/pulse/buy-vs-build-integration-software-nikhil-hasija>.

Paulette Carter, "The Pros and Cons of Custom Software vs. Off-the-Shelf Solutions", Sep. 28, 2015, 5 pages. <http://web.archive.org/web/20180303002310/http://pcdgroup.com/the-pros-and-cons-of-custom-software-vs-off-the-shelf-solutions/>.

John Spacey, "13 Examples of Requirements Risk", Mar. 17, 2021, Simplicable, 9 pages. <https://simplicable.com/new/requirements-risk>.

Andrew Blackman, "The Main Types of Business Risk", Dec. 8, 2014, 9 pages. <https://business.tutsplus.com/tutorials/the-main-types-of-business-risk--cms-22693>.

SoftwareTestingHelp.com, "Types of Risks In Software Projects", Jan. 3, 2022, 17 pages. <https://www.softwaretestinghelp.com/types-of-risks-in-software-projects/?nowprocket=1>.

Rob Brothers et al., "Third-Party Enterprise Software Support: Key Risks and Questions to Ask", IDC Analyze the Future, Dec. 2017, 9 pages.

Bella Renney, "Build vs. Buy: The hidden cost of building and maintaining in-house integrations for product leaders", tray.io blog, downloaded on the Internet on Jan. 25, 2022, 11 pages. <https://tray.io/blog/build-vs-buy>.

\* cited by examiner

User Response Matching based Recommendation:

| Overall Recommendation | Buy: 22.55% | Build: 77.45% |
|---|---|---|
| Strategic Factors | 16.67 | 83.33 |
| Application Characteristic | 33.33 | 66.67 |
| Budget & Cost | Not Evaluated | Not Evaluated |
| Risk Factors | 17.65 | 82.35 |

*FIG. 6*

[#] Cost & Budget >> Budget >> Budget Estimate

- Budget estimate: It is the amount that can be spend for buying or building an application
- How to measure it?
  - Query: What is the estimated budget for the application?
  - Type: Numerical (units $/€/etc.)
- Impact on build vs buy decision
  - Higher budget estimates imply better affordability for acquiring the application, e.g., being able to buy solutions with higher licensing fees if solution to the problem is available in the market. On the other hand, relatively lower budget allocations might push towards custom build, where there may be better control over the costs over time

*FIG. 7 (CONT.)*

[#] Cost & Budget >> Cost to build >> In-house Expertise

- In-house expertise indicates availability of the technical experts within organization for building the application

- How to measure it?
  - Query: Is required in-house technical expertise available within the organization to build the application?
  - Type: tertiary
  - Values:
    - High: it states that employees are very expert, can easily develop an application
    - Acceptable: it states that employees can be manage and build the application to solve problem
    - Low: it states that employees are not as expert to build application needed to solve the problem

- Impact on build vs buy decision
  - Without technical expertise, building a software may lead to quality issues or potential project failures/delays. In such case buying may be a preferable option

*FIG. 7 (CONT.)*

[#] Application Characteristics

Rule:
*If (Is application available in the market for solving the problem?==No)*

Recommendation: Build

Explanation:
If there is no off-the-shelf solution available in the market which can solve the problem then organization has to opt for building their solution in order to solve the problem. In such case, factors like cost and time becomes irrelevant as unavailability of solution to the problem left organization with no choice except building their own solution

*FIG. 7 (CONT.)*

CONTINUOUS LEARNING-BASED APPLICATION RELATED TRADE-OFF RESOLUTION AND IMPLEMENTATION

PRIORITY

The present application claims priority under 35 U.S.C. 119(a)-(d) to Indian Provisional Patent Application number 202011017756, having a filing date of Apr. 25, 2020, and Indian Provisional Patent Application number 202011030399, having a filing date of Jul. 16, 2020, the disclosures of which are hereby incorporated by reference in their entireties.

BACKGROUND

An organization may perform various operations related to applications, such as software applications. For example, an organization may purchase, upgrade, maintain, discard, and perform other such operations related to applications during performance of tasks that utilize such applications. An organization may utilize various tools to perform analytics to determine whether to purchase, upgrade, maintain, discard, and/or perform other operations related to the applications.

BRIEF DESCRIPTION OF DRAWINGS

Features of the present disclosure are illustrated by way of example and not limited in the following figure(s), in which like numerals indicate like elements, in which:

FIG. 6 illustrates overall recommendations associated with the continuous learning-based application related trade-off resolution and implementation apparatus of FIG. 1 in accordance with an example of the present disclosure;

DETAILED DESCRIPTION

Figure 1:
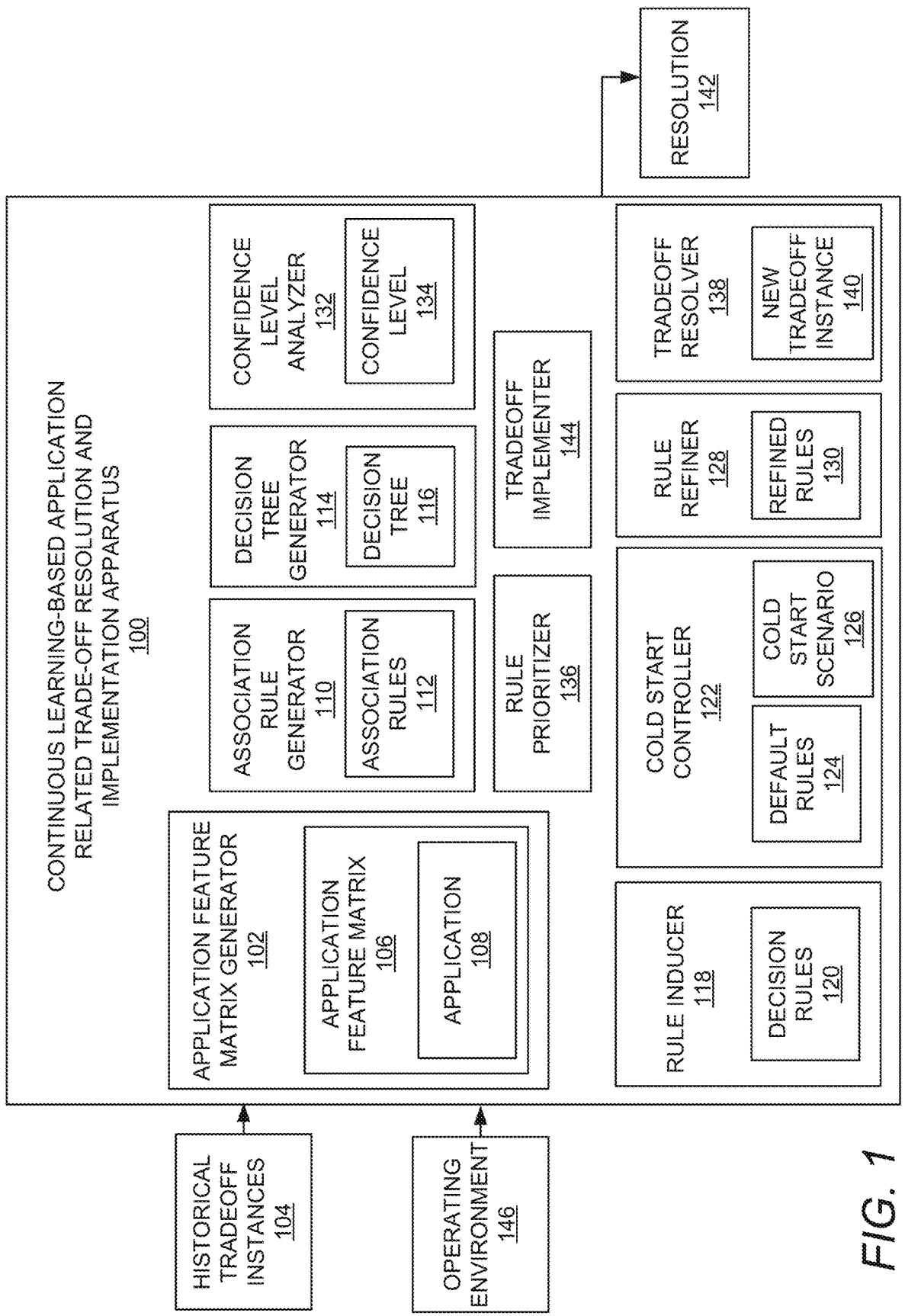
FIG. 1 illustrates a layout of a continuous learning-based application related trade-off resolution and implementation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Continuous learning-based application related trade-off resolution and implementation apparatuses, methods for continuous learning-based application related trade-off resolution and implementation, and non-transitory computer readable media having stored thereon machine-readable instructions to provide continuous learning-based application related trade-off resolution and implementation are disclosed herein. The apparatuses, methods, and non-transitory computer readable media disclosed herein provide for utilization of hybrid synthesis of data and rule driven techniques to build a machine learning model, and discover a set of association rules to capture latent patterns from historical data. For an example of buying versus building an application, the apparatuses, methods, and non-transitory computer readable media disclosed herein may implement the details for deciding factors, and provide recommendations using the learnt machine leaning model and association rules. Furthermore, the apparatuses, methods, and non-transitory computer readable media disclosed herein may continuously update the machine learning model, as well as a rule-set, based upon interactions with the environment.

With respect to the general aspect of trade-off resolution and implementation of results of the resolution, assuming that an organization is facing a challenge to resolve a trade-off related to procuring an application, such as a software application, where resolution depends upon detailed factorial analysis of the organization context and application characteristics and associated interactions, a trade-off may require selection of an asymptotically optimal option among multiple choices. In this regard, asymptotic optimality may mean that after a certain point in time (e.g., in the future, as opposed to immediately), a selected option regarding procurement of the application may provide higher returns on the investment. Another example of trade-off resolution and implementation may include a challenge for an organization to acquire a new organization to perform a particular function, or to instead perform the function internally.

For the example of procurement of an application, when an organization decides that a new application is needed, the organization may be faced with the trade-off as to whether they should buy a ready-to-use third party solution (e.g., commercial off-the-shelf (COTS) software, open source software (OSS)), or whether they should build the application de-novo (e.g., custom, bespoke, and tailor-made software). In this regard, it is technically challenging to determine which of these choices would turn out to be asymptotically correct (e.g., after a certain point in time (in the future), selected option (build or buy) would provide comparatively better returns on the investment).

In a continuously changing environment, it is technically challenging to choose whether to buy a ready-to-use third party solution, or build an application de-novo because both the options include complex aspects that require deep analysis. The apparatuses, methods, and non-transitory computer readable media disclosed herein may overcome the aforementioned technical challenges by providing a general-purpose automated system to determine which trade-off option is best, and to further implement a recommended (or selected) trade-off option. For the build versus buy example of procurement of an application, the apparatuses, methods, and non-transitory computer readable media disclosed herein may determine whether to buy a ready-to-use third party solution, or build an application de-novo, as well as to implement (e.g., perform) the building of the application. The apparatuses, methods, and non-transitory computer readable media disclosed herein may also address multiple technical challenges including deciding as to which factors matter in-practice to differentiate buy and build choices, determining in which scenarios/contexts trade-offs are maximal and decisions are challenging, determining what type of tool support may help to solve the problem, and determining the defining characteristics of the solution and how prior data and information can be used to arrive at a plausible solution for new scenarios.

With respect to the general aspect of trade-off resolution and implementation, for the build versus buy example scenario disclosed herein, other technical challenges may include evaluation of factors such as the ever increasing opportunities to buy applications for potentially any conceivable purpose, relatively easier and free access to sophisticated application programming interfaces (APIs) and components, and enablement of quick prototyping and build. Other aspects that may need to be evaluated include continuously evolving market dynamics, where buying (or building) a system which turns out to be unsuitable in the future may result in both revenue and market loss. Yet further, other aspects that may need to be evaluated include system design complexities, where investment into building a system, which eventually exceeds budget and time constraints may also result in missed market opportunity. Moreover, additional technical challenges associated with the general aspect of trade-off resolution and implementation include a problem dimension that analyzes which factors really matter, in which scenarios/contexts trade-offs are maximal and decisions are difficult, and what kind of tool support may help solving the problem.

The apparatuses, methods, and non-transitory computer readable media disclosed herein may address the aforementioned technical challenges by implementing a solution dimension by defining characteristics of the solution, generalizability, temporal relevance, explainability, and continuous learning.

According to an example, the apparatuses, methods, and non-transitory computer readable media disclosed herein may address the aforementioned technical challenges by implementing an approach where a trade-off may be modeled as follows:

$$\text{Tradeoff}(\vec{x}) = f(\vec{x} | t, \vec{X}, \vec{\beta}, \in) \qquad \text{Equation (1)}$$

For Equation (1), $\vec{x}$ may represent a new application, $\vec{\beta}$ may represent which factors matter in the current context, f may represent continuous learning of decision rules and machine learning model to minimize uncertainties, E may represent how much does a factor matter in the current context, and t may represent a time-point of using, executing, and/or applying the apparatuses, methods, and non-transitory computer readable media as disclosed herein.

For a build versus buy example of the tradeoff Equation (1) for building or buying a software application, Equation (1) may be represented as follows:

$$\text{Build\_or\_Buy}(\vec{x}) = f(\vec{x} | t, \vec{X}, \vec{\beta}, \in) \qquad \text{Equation (2)}$$

For Equation (2), $\vec{x}$ may represent an application, $\vec{\beta}$ may represent which factors matter in the current context, f may represent continuous learning of decision rules to decide build versus buy, and $\in$ may represent how much does a factor matter in the current context.

For the apparatuses, methods, and non-transitory computer readable media disclosed herein, the apparatus may include a build or buy advisory (BBA) functionality, where interactions with respect to automated software (SW) delivery service may be implemented as follows. For the example of procurement of the software application, at the outset, an operating environment may send details of the application and business parameters to the apparatus. The apparatus may estimate uncertainties associated with conflicting choices. The apparatus may return a recommended action with minimum cost (or lowest uncertainty) as a solution to the operating environment. With respect to continuous learning, the operating environment may accept or reject the solution from the apparatus, and the apparatus may update its recommendation model using this feedback from the operating environment. Further, the operating environment may initiate a build or buy action through an automated tradeoff implementer. For example, the tradeoff implementer may search and select for application programming interfaces matching functional requirements of the application, which would be integrated as per templatized design architecture to build the application. With respect to initiation of build or buy actions, with respect to building, the tradeoff implementer may provide for design template generation for a new scenario (e.g., for a build recommendation), or vendor selection (e.g., for a buy recommendation).

The apparatuses, methods, and non-transitory computer readable media disclosed herein thus facilitate resolution of a decision of whether an investment for a new application is to be made by building the application de-novo (e.g., custom software) or whether the application should be bought (e.g., a ready-to-use solution from the market). The apparatuses, methods, and non-transitory computer readable media disclosed herein thus implement a process of decision making using a synthesis of continuously evolving data and rule driven approaches, where the end results include generation of explainable decisions, which are evolved by continuous interaction with an environment.

The apparatuses, methods, and non-transitory computer readable media disclosed herein further provide technical benefits of optimizing and automating the process of estimating uncertainties associated with rewards versus risks to more efficiently decide in a way that the decision is more likely to turn out to be asymptotically correct (e.g., after certain point in time, selected option should provide better rewards in-practice to the software delivery environment).

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example continuous learning-based application related trade-off resolution and implementation apparatus (hereinafter also referred to as "apparatus 100").

Referring to FIG. 1, the apparatus 100 may include an application feature matrix generator 102 that is executed by at least one hardware processor (e.g., the hardware processor 1202 of FIG. 12, and/or the hardware processor 1404 of FIG. 14) to generate, based on a plurality of historical tradeoff instances 104, an application feature matrix 106 for an application 108.

An association rule generator 110 that is executed by at least one hardware processor (e.g., the hardware processor 1202 of FIG. 12, and/or the hardware processor 1404 of FIG. 14) may generate, based on the application feature matrix 106, association rules 112 for historical tradeoff instances for which decisions are not known.

According to examples disclosed herein, the application feature matrix generator 102 may generate application feature vectors based on interactions with an operating environment. Further, the association rule generator 110 may generate, based on the application feature vectors, the association rules 112 for historical tradeoff instances for which decisions are not known.

A decision tree generator 114 that is executed by at least one hardware processor (e.g., the hardware processor 1202 of FIG. 12, and/or the hardware processor 1404 of FIG. 14) may generate, based on the application feature matrix 106, a decision tree 116 for historical tradeoff instances for which decisions are known.

A rule inducer 118 that is executed by at least one hardware processor (e.g., the hardware processor 1202 of FIG. 12, and/or the hardware processor 1404 of FIG. 14) may induce, based on the generated association rules 112 and the generated decision tree 116, decision rules 120.

A cold start controller 122 that is executed by at least one hardware processor (e.g., the hardware processor 1202 of FIG. 12, and/or the hardware processor 1404 of FIG. 14) may apply default rules 124 to a cold start scenario 126.

A rule refiner 128 that is executed by at least one hardware processor (e.g., the hardware processor 1202 of FIG. 12, and/or the hardware processor 1404 of FIG. 14) may refine the decision rules 120 and the default rules 124 to generate refined rules 130.

According to examples disclosed herein, the rule refiner 128 may refine the decision rules 120 and the default rules 124 to generate the refined rules 130 by performing rule unification to refine the decision rules 120 and the default rules 124 by eliminating redundancies to generate the refined rules 130.

A confidence level analyzer 132 that is executed by at least one hardware processor (e.g., the hardware processor 1202 of FIG. 12, and/or the hardware processor 1404 of FIG. 14) may determine, for each of the refined rules 130, a confidence level 134.

A rule prioritizer 136 that is executed by at least one hardware processor (e.g., the hardware processor 1202 of FIG. 12, and/or the hardware processor 1404 of FIG. 14) may prioritize, based on the determined confidence level 134, the refined rules 130.

A tradeoff resolver 138 that is executed by at least one hardware processor (e.g., the hardware processor 1202 of FIG. 12, and/or the hardware processor 1404 of FIG. 14) may apply, in order of priority, a specified number of the refined rules to a new tradeoff instance 140. Further, the tradeoff resolver 138 may generate, based on the application of the specified number of the refined rules to the new tradeoff instance 140, a resolution 142 associated with the new tradeoff instance 140.

A tradeoff implementer 144 that is executed by at least one hardware processor (e.g., the hardware processor 1202 of FIG. 12, and/or the hardware processor 1404 of FIG. 14) may implement (e.g., perform), with respect to the new tradeoff instance 140, the resolution 142 associated with the new tradeoff instance 140.

According to examples disclosed herein, the application feature matrix generator 106 may update, based on the plurality of historical tradeoff instances 104 and the resolution 142 associated with the new tradeoff instance 140, the application feature matrix 106.

According to examples disclosed herein, the tradeoff implementer 144 may implement, with respect to the new tradeoff instance 140, the resolution 142 associated with the new tradeoff instance 140 by implementing, with respect to the new tradeoff instance 140 that includes a build versus buy option for a new application, the resolution 142 that includes instructions to build or buy the new application.

According to examples disclosed herein, the tradeoff implementer 144 may implement, with respect to the new tradeoff instance 140, the resolution 142 associated with the new tradeoff instance 140 by implementing, with respect to the new tradeoff instance 140 that includes a build versus buy option for a new application, the resolution 142 that includes generation of the new application.

According to examples disclosed herein, the tradeoff implementer 144 may implement, with respect to the new tradeoff instance 140 that includes the build versus buy option for the new application, the resolution 142 that includes generation of the new application by generating a design template for the new application.

According to examples disclosed herein, the tradeoff implementer 144 may implement, with respect to the new tradeoff instance 140, the resolution 142 associated with the new tradeoff instance 140 by implementing, with respect to the new tradeoff instance 140 that includes a build versus buy option for a new application, the resolution 142 that includes buying the new application. In this regard, the tradeoff implementer 144 may perform, based on the resolution 142 that includes buying the new application, vendor selection for the new application.

According to examples disclosed herein, the tradeoff implementer 144 may implement, with respect to the new tradeoff instance 140, the resolution 142 associated with the new tradeoff instance 140 by determining confidence levels associated with options for the resolution 142, and implementing the resolution 142 that includes a higher confidence level from the determined confidence levels.

Operation of the apparatus 100 is described in further detail with reference to FIGS. 1-11.

Figure 2:
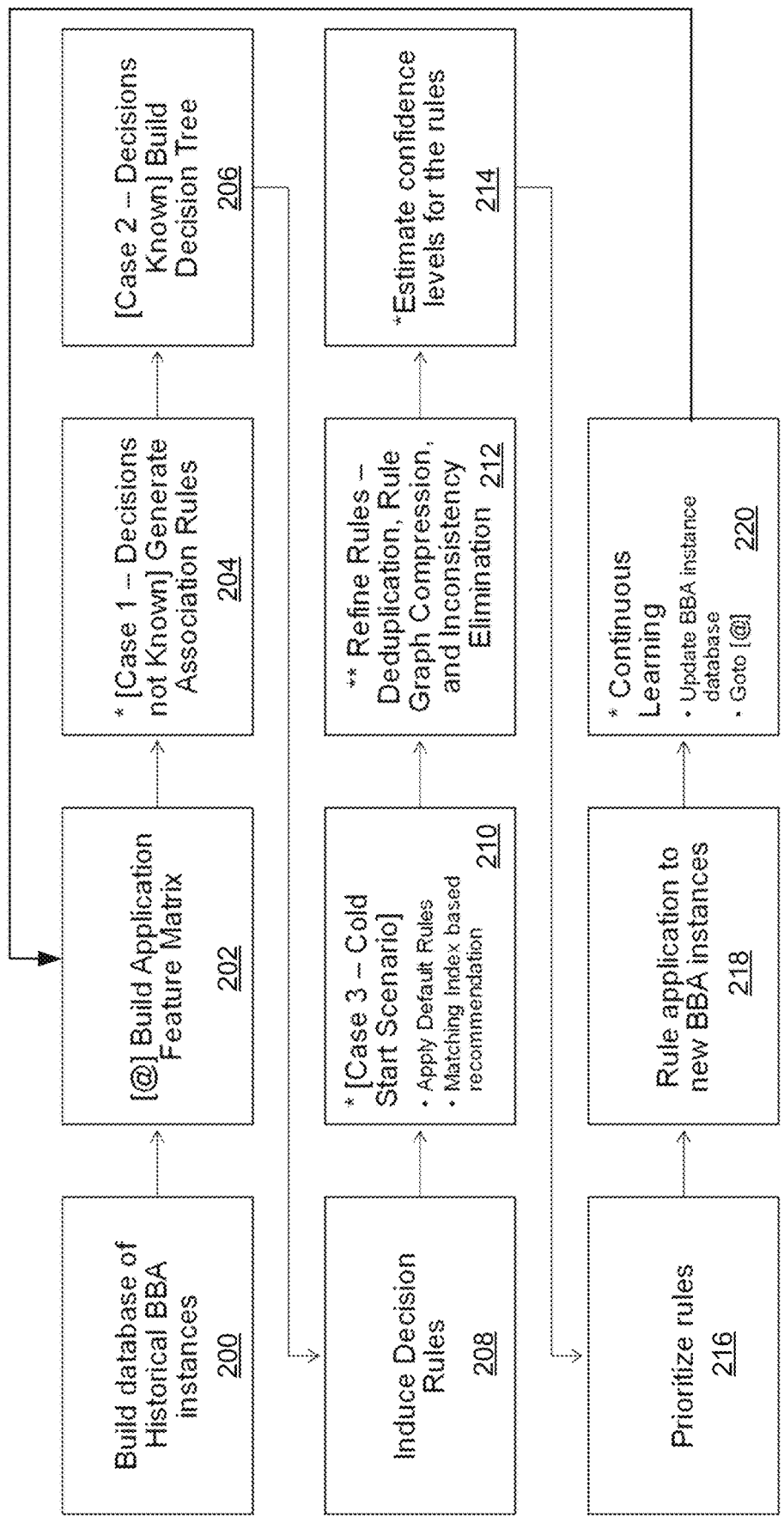
FIG. 2 illustrates an operational flow associated with an application build versus buy example of operation of the continuous learning-based application related trade-off resolution and implementation apparatus of FIG. 1 in accordance with an example of the present disclosure.

FIG. 2 illustrates an operational flow associated with an application build versus buy example of operation of the apparatus 100 in accordance with an example of the present disclosure.

Referring to FIG. 2, at block 200, a database may be built with the historical tradeoff instances 104, which may include historical build or buy advisory (BBA) instances. The database may include, for example, characteristics of the application 108, as well as how the tradeoff was resolved.

At block 202, in order for the application feature matrix generator 102 to generate the application feature matrix 106, decision rules may be learned by the application feature matrix generator 102. In this regard, the application feature matrix generator 102 may generate application feature vectors by first continuously learning rules from interactions with the operating environment 146. Each build versus buy instance may be captured as an application-feature-vector (AFV) Z of the form:

$$Z=[sf_1, \ldots, sf_N, ac_1, \ldots ac_M, bc_1, \ldots bc_L, r_1, \ldots r_K] \quad \text{Equation (3)}$$

For Equation (3), $sf_1, \ldots, sf_N$ may represent a valuation of strategic factors, $ac_1, \ldots ac_M$ may represent a valuation of application characteristics, $bc_1, \ldots bc_L$ may represent a valuation of budget and cost factors, and $r_1, \ldots r_K$ may represent a valuation of risk factors. For example, with respect to the artificial intelligence based health care example as disclosed herein, $sf_1$=YES is a valuation of the factor $sf_1$≈Competitive Landscape.

With respect to the application feature matrix 106, decisions for build versus buy instances may be associated with corresponding application-feature-vectors as class labels $Z:D_z$, where $D_z$: Buy|Build. In this regard, for $\Delta=\{Z_1, \ldots, Z_n\}$, $\Delta:D$ may represent the application feature matrix 106 containing all build versus buy instances together with corresponding decisions such that each of $Z_1, \ldots, Z_n$ form rows in the matrix, D forms the last column in the matrix, and n represents a number of historical build versus buy instances.

At block 204 that Is described herein as "Case 1" with respect to decisions not known for build or buy advisory execution instances, under this scenario only application-feature-vectors may be available to the association rule generator 110. An example of a decision not known advisory instance may include a stage where details on various factors are being collected prior to a decision being made. Further, the association rule generator 110 may generate association rules 112 among factors. Each association rule may specify which of the factors assume positive or higher valuations (e.g., YES/HIGH) together in a significant number of instances (e.g., $(sf_2$=YES)AND$(sf_3$=YES)→$(rf_3$=YES)).

Figure 7:
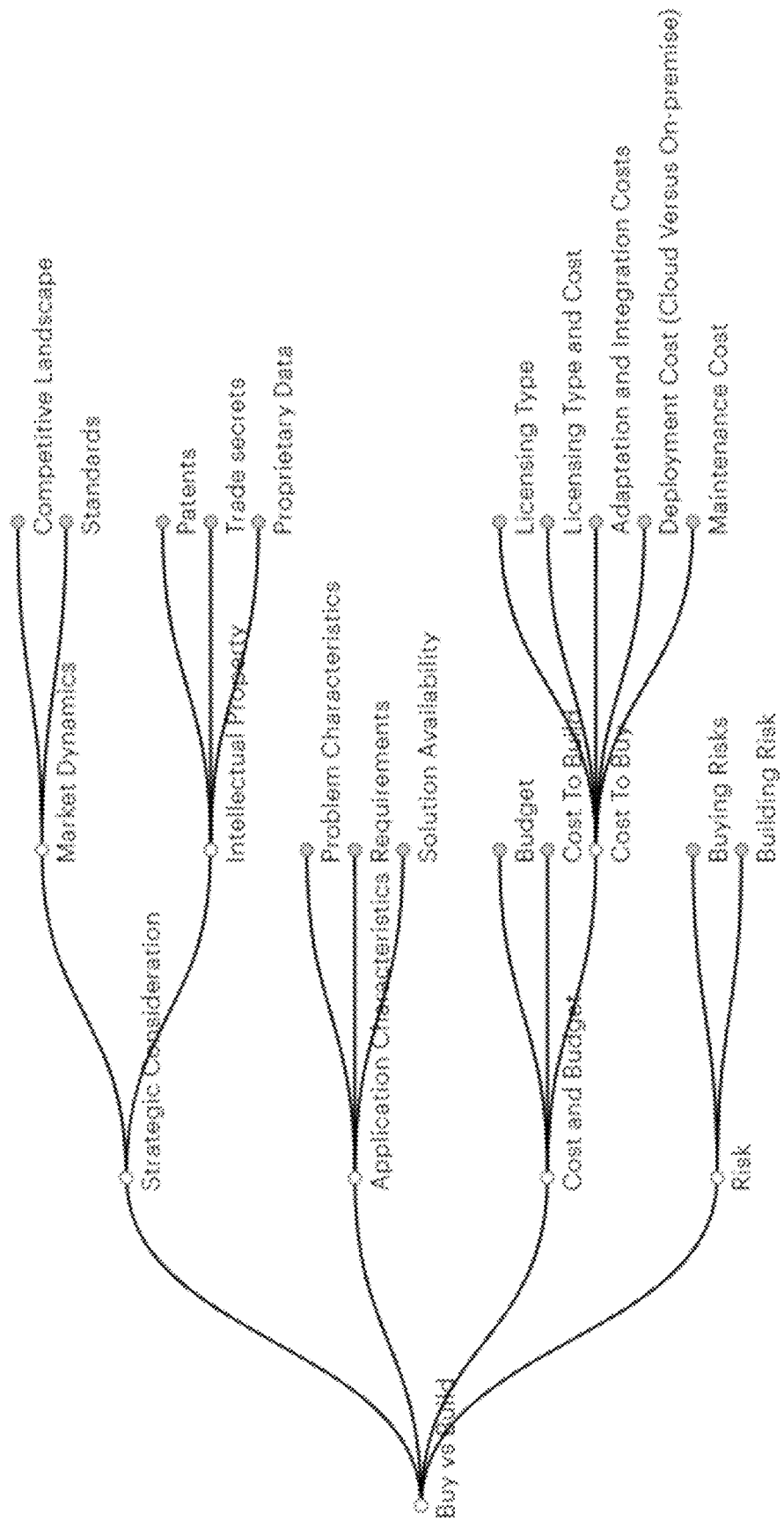
FIG. 7 illustrates features of an ontology of factors associated with the continuous learning-based application related trade-off resolution and implementation apparatus of FIG. 1 in accordance with an example of the present disclosure.

With respect to block 204, the association rule generator 110 may specify I to be the set of all factors in the ontology (e.g., see ontology of FIG. 7). As a first step (e.g., [Step 1]), from each application-feature-vector $Z \in \Delta$, the association rule generator 110 may extract a transaction $t_z$ consisting of only those factors having positive or higher valuations (e.g., YES/HIGH).

As a second step (e.g., [Step 2]), the association rule generator 110 may generate transaction-set T as a set of all these transactions as follows:

$$T=\{t_1, t_2, \ldots, t_n\} \quad \text{Equation (4)}$$

As a third step (e.g., [Step 3]), the association rule generator 110 may populate a list of association rules as implications of the form:

$$X \rightarrow Y \quad \text{Equation (5)}$$

The association rule generator 110 may utilize conditions as follows:

X and Y are subsets of I     [Condition 1]:

there is no factor common between X and Y     [Condition 2]:

An association rule may be in the form of a pattern specifying that when factors in X are positive or high, factors in Y are also the same with a certain probability.

As a fourth step (e.g., [Step 4]), the association rule generator 110 may estimate support for a rule X→Y as:

$$\sup(X \rightarrow Y)=\text{Probability}(X \cup Y) \quad \text{Equation (6)}$$

As a fifth step (e.g., [Step 5]), the association rule generator 110 may determine confidence for a rule X→Y as a measure of how often if factors in X received positive or higher valuations then also factors in Y as follows:

$$\text{conf}(X \rightarrow Y)=\text{Probability}(Y|X) \quad \text{Equation (7)}$$

Equation (7) may be determined, for example, by using Bayes Theorem.

As a sixth step (e.g., [Step 6]), the association rule generator 110 may set a minimum support threshold parameter as $\alpha_{sup}$=0.5, and a minimum confidence parameter as $\alpha_{conf}$=0.7. These parameters may be set to any other value between 0 and 1 by the operating environment 146. Further the thresholds may be specified to eliminate statistically insignificant rules from consideration.

As a seventh step (e.g., [Step 7]), the association rule generator 110 may apply, for example, a process for efficient discovery of statistically significant association rules using inputs from the above steps (e.g., [Step 1] to [Step 6]) to generate association rules 112 with minimum support and confidence levels.

Referring again to FIG. 2, at block 206 that is described herein as "Case 2" with respect to decisions available for build or buy advisory execution instances, in this case, application-feature-vectors together with decisions may be available to the decision tree generator 114 for each instance of its historical execution. Further, the decision tree generator 114 may build, as shown in FIG. 3, a decision tree 116 using the historical data-set as training data, and apply known rule induction techniques for extracting the rules.

The decision tree generator 114 may build the decision tree 116, for example, using techniques such as C4.5 or Chi-square automatic interaction detection (CHAID), with high cross-validation performance (e.g., F1>0.9) using the matrix Δ:D. In this regard, each branch of the decision tree 116 may result in a rule. The classification rules may be updated by the operating environment 146. The decision tree 116 or alternatively any other supervised classification technique may be used to build a machine learning model which the tradeoff resolver 138 may use to recommend, for example, to build or buy.

Figure 3:
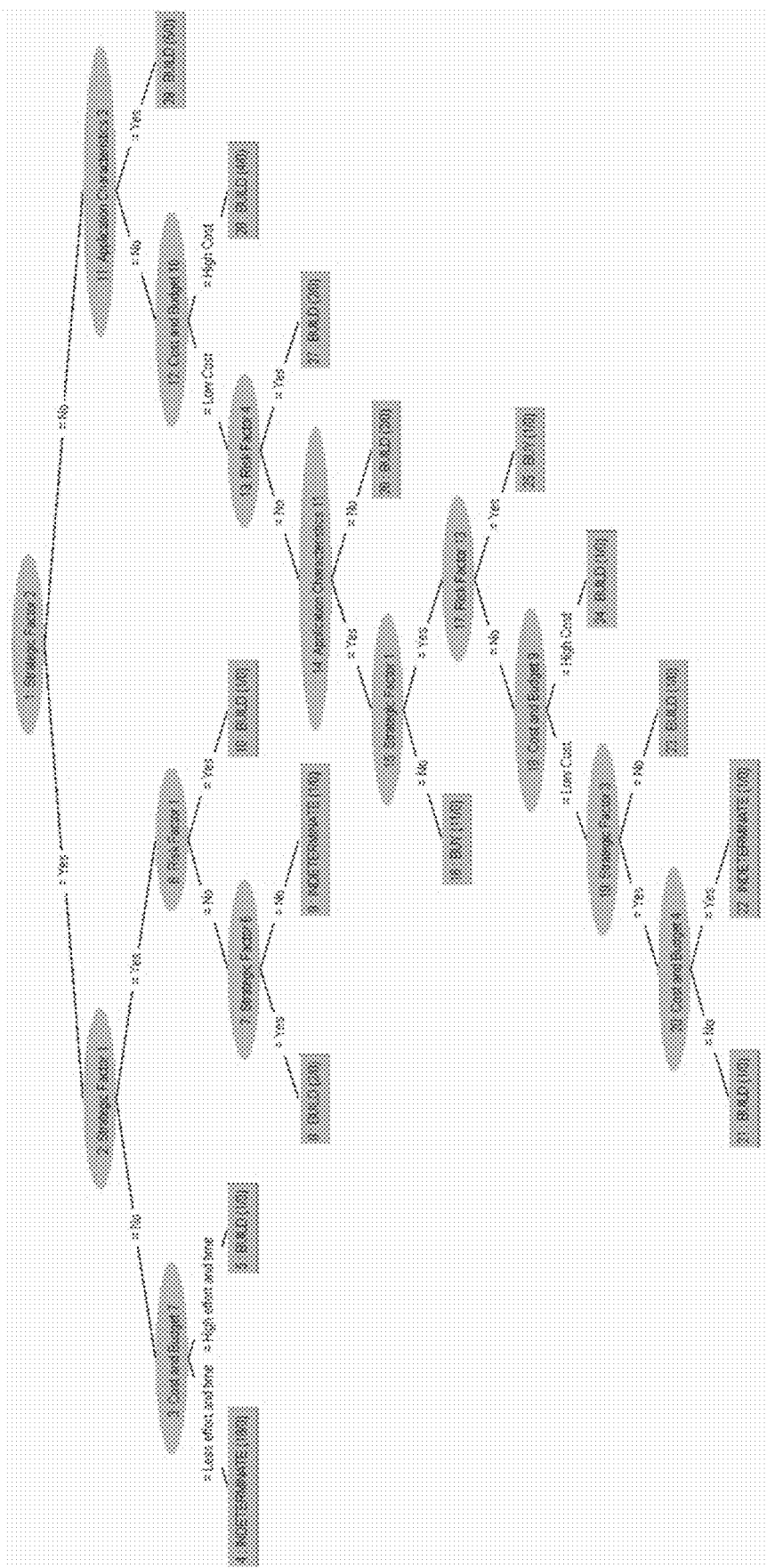
FIG. 3 illustrates a decision tree associated with the continuous learning-based application related trade-off resolution and implementation apparatus of FIG. 1 in accordance with an example of the present disclosure.

Referring to FIGS. 2 and 3, with respect to decision rule induction at block 208 associated with the decision tree 116 of FIG. 3, examples of rules that may be induced by the rule inducer 118 are as follows:

Rule-1: (Strategic Factor 2="YES") AND (Strategic Factor 1="YES") AND (Risk Factor 1="YES") → BUILD With respect to Rule-1, for the example of build versus buy for an application, should the application comply with organizational regulations?"="YES") AND ("Can the organization gain competitive advantage by the application?"="YES") AND ("Have requirements passed ambiguity checks?"="YES") → BUILD.

Rule-2: (Strategic Factor 2="NO") AND (Application Characteristic 3="YES") → BUILD With respect to Rule-2, for the example of build versus buy for an application, should the application comply with organizational regulations?"="NO") AND ("Is application available in the market for solving the problem?"="YES") → BUILD.

Rule-3: (Strategic Factor 2="YES") AND (Strategic Factor 1="NO") AND (Cost and Budget 7="Less") → INDETERMINATE With respect to Rule-3, for the example of build versus buy for an application, should the application comply with organizational regulations?"="YES") AND ("Can the organization gain competitive advantage by the application?"="NO") AND ("What is the required efforts from employees to build the application?"="Less") → INDETERMINATE Rule-4: (Strategic Factor 2="NO") AND (Application Characteristic 3="NO") AND (Cost and Budget 10="LOW') AND (Risk Factor 4="NO") AND (Application characteristic 11="YES") AND (Strategic Factor 1="NO") → BUY.

With respect to Rule-4, for the example of build versus buy for an application, should the application comply with organizational regulations?"="NO") AND ("Is application available in the market for solving the problem?"="NO") AND ("What is the cost of integrating the application with the current process?"="LOW COST") AND ("Have requirements been assessed for technical feasibility?"="NO") AND ("Is the organization looking for an application where code, service and business processes can be re used throughout the organization?"="YES") AND ("Can the organization gain competitive advantage by the application?"="NO") → BUY.

Rule-5: (Strategic Factor 2="NO") AND (Application characteristics 3="NO") AND (Cost and Budget 10="LOW COST") AND (Risk Factor 4="NO") AND (Application characteristics 11="YES") AND (Strategic Factor 1="YES") AND (Risk Factor 13="NO") AND (Cost and Budget 9="LOW COST") AND (Strategic Factor 3="YES") AND (Cost and Budget 4="NO") → BUILD With respect to Rule-5, for the example of build versus buy for an application, should the application comply with organizational regulations?"="NO") AND ("Is application available in the market for solving the problem?"="NO") AND ("What is the cost of integrating the application with the current process?"="LOW COST") AND ("Have requirements been assessed for technical feasibility?"="NO") AND ("Is the organization looking for an application where code, service and business processes can be re used throughout the organization?"="YES") AND ("Can the organization gain competitive advantage by the application?"="YES") AND ("Does the vendor trustworthy enough to protect data breaches?"="NO") AND ("Please mention the cost of selected license type?"="LOW COST") AND ("Should application comply with geographical regulations?"="YES") AND ("Is open source support available for the Application?"="NO") → BUILD.

Referring again to FIG. 2, at block 210 that is described herein as "Case 3" with respect to the cold start scenario 126, in scenarios when the application feature matrix 106 is NULL, e.g., no instances of historical executions are available, no decision rules 120 or association rules 112 may be induced. In such scenarios, the cold start controller 122 may perform the tasks of (Step 1) applying a set of default rules populated from sources, where the rules may include default rules 124 from the operating environment 146, and (Step 2) recommending using confidence score estimation. An example of a default rule is shown in FIG. 7 as the rule "If ("Is application available in the market for solving the problem?"="No"); then Recommendation is Build." An example of a source may be an existing rule base from practitioners.

Next, matching confidence scores may be estimated as follows:

$$conf(\text{Buy}) =$$
$$Prob(\overline{X}_{client} \sim \overline{X}_{Buy}) = \frac{1}{N}\sum_{i=1}^{i=N} \alpha_i * m(\overline{X}_{client}[i], \overline{X}_{Buy}[i])$$

Equation (8)

$$conf(\text{Build}) =$$
$$Prob(\overline{X}_{client} \sim \overline{X}_{Build}) = \frac{1}{N}\sum_{i=1}^{i=N} \alpha_i * m(\overline{X}_{client}[i], \overline{X}_{Build}[i])$$

Equation (9)

For Equations (8) and (9), $N$ = number of factors $\overline{X}_{client}$: Vector consisting of client scenario $\overline{X}_{Buy}$: Vector consisting of Buy reference levels $\overline{X}_{Build}$: Vector consisting of Build reference levels $m(a, b) = \begin{cases} 1 & \text{if } a = b \\ 0 & \text{otherwise} \end{cases}$ $\alpha_i$: Relative significance of $i^{th}$ factor under the condition that $\Sigma\alpha_i=1$ Examples of $\alpha_i=0.3$, and $\overline{X}_{Build}$ and $\overline{X}_{Buy}$ are Yes and No, respectively, for an example of reference levels as strategic factors, where the factor includes competitive landscape, and an evaluation criteria includes "Can the organization gain competitive advantage by the application?" According to another example of $\overline{X}_{Build}$ and $\overline{X}_{Buy}$ as No and Yes, respectively, for the example of reference levels as strategic factors, the factor may include governing standards, and an evaluation criteria may include "Should application comply with geographical regulations?". With respect to $\overline{X}_{client}$, for an example of risk factors where factor includes ambiguity, evaluation criteria includes "Have requirements passed ambiguity checks?", $\overline{X}_{Build}$ and $\overline{X}_{Buy}$ are Yes and No, respectively, $\overline{X}_{client}$ may be specified as Yes. For another example of $\overline{X}_{client}$, for an example of risk factors where factor includes incompleteness, evaluation criteria includes "Are requirements technically complete?", $\overline{X}_{Build}$ and $\overline{X}_{Buy}$ are Yes and No, respectively, $\overline{X}_{client}$ may be specified as Yes. Generally, examples of reference levels may include strategic factors such as standards, regulations, intellectual property protection, etc., application characteristics such as solution availability, scalability, security, standards compliance, etc., cost and budget such as budget type, built team cost, license cost, etc., and risk factors such as incompleteness, infeasibility, reliability, etc. Moreover, each of these strategic factors may include an evaluation criterion, and build and buy reference levels.

The reference levels as disclosed herein may be utilized with Equations (8) and (9) to estimate m(a, b).

Referring again to FIGS. 1 and 2, at block 212 of FIG. 2, with respect to refinement of decision rules 120 (e.g., build versus buy decision rules) and with respect to rule unification, in scenarios when the set of decision rules induced from the decision tree 116 and the set of decision rules from the operating environment are both non-empty, the rule refiner 128 may unify these two sets of decision rules in order to eliminate all redundant rules (e.g., deduplication) from both of these sets, and merge these sets of rules after eliminating redundancies.

With respect to rule unification and deduplication, for $R_{dtree}$ defined as a set of decision rules induced from the decision tree, and $R_{openv}$ defined as a set of decision rules induced from the operating environment, all the decision-rules from one of the sets having a duplicate in the other set may be deleted. With respect to $R_{dtree}$, Rule-1 to Rule-5 as described above may belong to $R_{dtree}$, and the default decision rules as disclosed herein may belong to $R_{openv}$. In this regard, duplicate rules may be found using, for example, string matching or similar techniques dependent upon the format in which decision rules are encoded. Further, $R_{all} = R_{dtree} \cup R_{openv}$ may be described to be a union set of decision rules (with duplication elimination).

With respect to rule unification and rule subsumption, a rule of form (X OR Y→D) subsumes rules (X→D) and (Y→D), where D is the decision (or recommendation) taking values from the set {Build, Buy}, and X and Y are logical formulas formed by logically connecting smaller logical formulas specifying how various application features assume valuations. For example, $$\left(\begin{array}{c}\text{Strategic Factor 2}\\=\text{``YES''}\end{array}\right) \text{AND}$$

$$\left(\begin{array}{c}\text{Strategic Factor 1}\\=\text{``YES''}\end{array}\right) \text{OR} \left(\begin{array}{c}\text{Risk Factor 1}\\=\text{``YES''}\end{array}\right) \to \text{Build}$$

subsumes $$\left(\begin{array}{c}\text{Strategic Factor 2}\\=\text{``YES''}\end{array}\right) \text{AND} \left(\begin{array}{c}\text{Strategic Factor 1}\\=\text{``YES''}\end{array}\right) \to \text{Build}$$

and $$\left(\begin{array}{c}\text{Risk Factor 1}\\=\text{``YES''}\end{array}\right) \to \text{Build}$$

With respect to rule unification and rule subsumption, a rule of form (X AND Y→D) is subsumed by rules (X→D) and (Y→D). For example, $$\left(\begin{array}{c}\text{Strategic Factor 2}\\=\text{``YES''}\end{array}\right) \text{AND} \left(\begin{array}{c}\text{Strategic Factor 1}\\=\text{``YES''}\end{array}\right) \to \text{Build}$$

is subsumed by $$\left(\begin{array}{c}\text{Strategic Factor 2}\\=\text{``YES''}\end{array}\right) \to \text{Build}$$

and $$\left(\begin{array}{c}\text{Strategic Factor 1}\\=\text{``YES''}\end{array}\right) \to \text{Build}$$

With respect to rule unification and a decision rule implication graph, $G_R = (V_R, E_R)$ may be defined as a decision rule implication graph (DRIG) such that for each rule r in $R_{all}$, a node $v_r$ may be created in $V_R$. $V_R$ may represent the set of nodes in $G_R$, and $E_R$ may represent the set of directed edges in $G_R$. The DRIG may be used with the rule unification process described below. Further, for each pair of nodes $(v_{r1}, v_{r2})$, a directed edge $v_{r1} \to v_{r2}$ may be generated in $E_R$ starting from $v_{r1}$ and ending at $v_{r2}$ if and only if rule r1 is subsumed by the rule r2. In this regard, node $v_{r1}$ may be referred as starting node and node $v_{r2}$ may be referred to as the ending node.

With respect to rule unification and graph compression, starting from the leaf nodes (e.g., the nodes on which no directed edge from any other node is ending), nodes which are starting nodes for any of the directed edges in $E_R$ may be iteratively removed. In this regard, removal of a node may also remove all the edges associated with it. Further, a rule corresponding to the node may be removed from the rule-set $R_{all}$. At the end of this process, a set of disjoint nodes in the resulting graph corresponding to those rules, which are not subsumed by any other rule, may be obtained. This process may retain only the largest rules in the set $R_{all}$.

Figure 4:
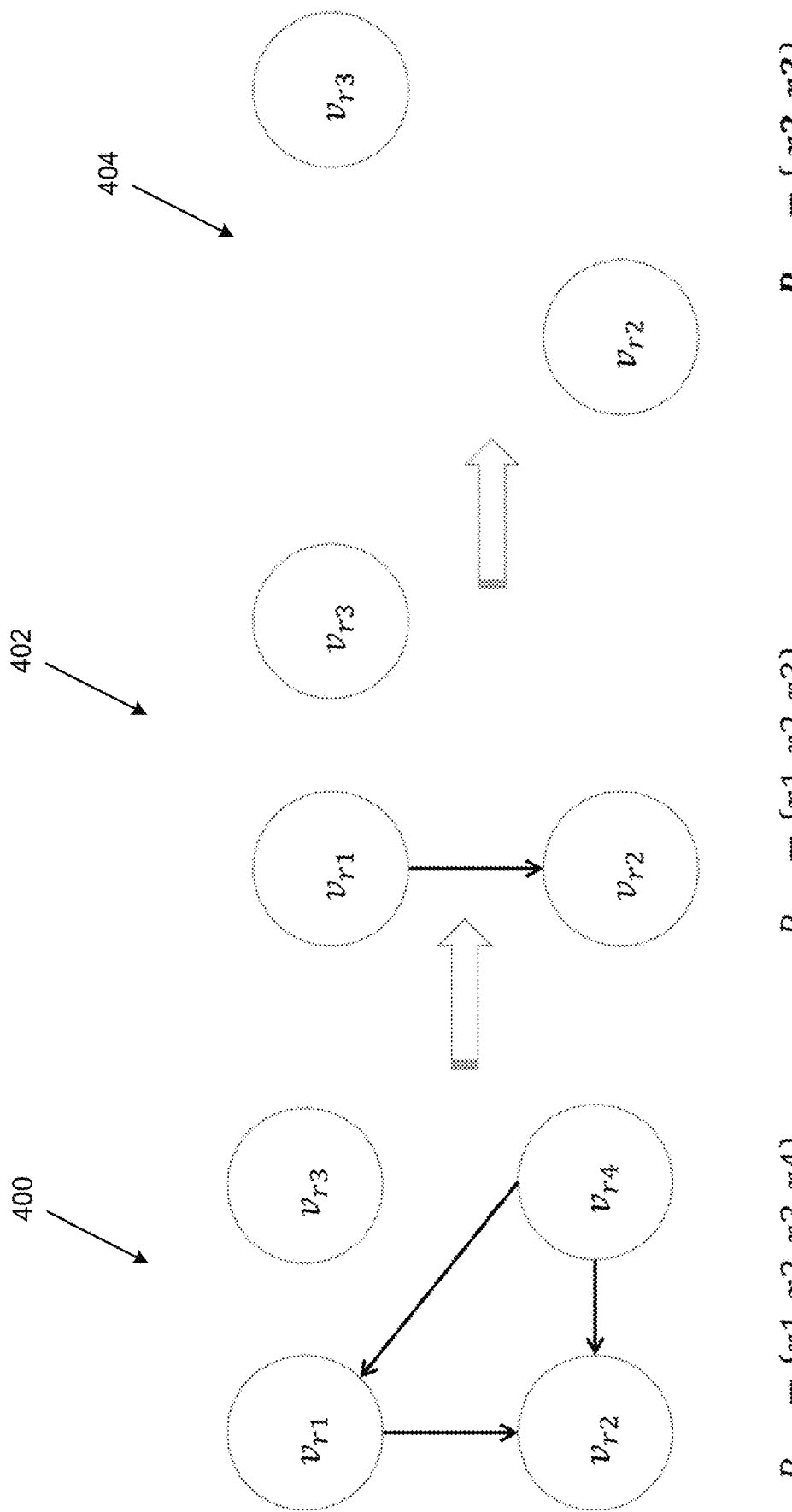
FIG. 4 illustrates rule unification and graph compression to illustrate operation of the continuous learning-based application related trade-off resolution and implementation apparatus of FIG. 1 in accordance with an example of the present disclosure.

FIG. 4 illustrates rule unification and graph compression to illustrate operation of the apparatus 100 in accordance with an example of the present disclosure. For FIG. 4, based on operation of the rule refiner 128, at 400, rule r4 may be eliminated (as no incoming edge comes to rule r4, and rule r4 does not subsume any other rule). At 402, rule r1 is eliminated as it is subsumed by rule r2. Thus, at 404, rules r2 and r3 remain, as they are not subsumed by another rule. For the example of FIG. 4, $G_R = (V_R, E_R)$ is the graph referenced at 400, $R_{all}$ includes one-to-one correspondence with $V_R$ which is described above, and further, nodes in $V_R$ are populated using $R_{all}$.

With respect to rule unification and elimination of rule inconsistencies, every pair of rules of the form (X→D) and (¬X→D) may be considered inconsistent, where ¬X is the logical negation of X as follows:

If $X \equiv \text{factor}_z == V$, then $\neg X \equiv \text{factor}_z == \text{complementary}(z, V)$  Equation (10)

For Equation (10), function complementary(z,V) returns values which are complementary to the value V for $\text{factor}_z$ If $X \equiv Y$ OR $Z$, then $\neg X \equiv \neg Y$ AND $\neg Z$ If $X \equiv Y$ AND $Z$, then $\neg X \equiv \neg Y$ OR $\neg Z$ For example:

$$\begin{pmatrix} \text{Strategic Factor 2} \\ = \text{"YES"} \end{pmatrix} \rightarrow \text{Build}$$

and $$\begin{pmatrix} \text{Strategic Factor 2} \\ = \text{"No"} \end{pmatrix} \rightarrow \text{Build}$$

may be considered inconsistent with each other. In this regard, the rule refiner 128 may remove all pairs of inconsistent rules or rule fragments from the compressed rule set.

Referring next to block 214 of FIG. 2, each decision-rule of the decision tree may be associated with a confidence level as determined by the confidence level analyzer 132, where the confidence level may measure a likelihood that if in an instance, the conditions of the rule are true, then the conclusion will also hold. For example, for the decision tree 116 of FIG. 3, the leftmost branch with the leaf node as INDETERMINATE, value (18/0) indicates that out of 18 instances in which the decision rule conditions corresponding to this branch were holding good, the final conclusion was also correctly labelled as INDETERMINATE.

A confidence level of a decision rule may be measured using, for example, Equation (7), where various probabilities may be estimated using the decision tree 116. For the example of FIG. 3, the confidence level 134 may be estimated as follows:

$$Pr(\text{Condition of Leftmost Branch} \rightarrow \text{INDETERMINATE}) =$$
$$Pr(\text{INDETERMINATE} \mid \text{Condition of Leftmost Branch}) =$$
$$\frac{Pr(\text{Condition of Leftmost Branch} \mid \text{INDETERMINATE}) \times Pr(\text{INDETERMINATE})}{Pr(\text{Condition of Leftmost Branch})} =$$

$$\frac{(1/3) \times ((18 + 1 + 1)/52)}{18/52} = 10/27 = 37\%$$

In scenarios where decision rules 120 are given by the operating environment (e.g., block 206 of FIG. 2), or are default rules 124, a confidence level 134 of each rule may be estimated by the confidence level analyzer 132 as follows:

Scenario 1: Cold Start Scenario (e.g., block 210 of FIG. 2)
  Confidence level of each rule (X→D) is inverse of the number of atomic clauses in its precedent X
  Each atomic clause is of the form (application feature==value)
    Example: (Proprietary Data==YES)
  In a decision rule of the type X→D, X is the precedent and D is the consequent Scenario 2: Historical database of past executions only contains application-feature-vectors but not the decisions (e.g., block 204 of FIG. 2)
  Confidence level of each association rule (X→Y) is estimated using Equation (7) as conf(X→Y)=Probability(Y|X)

Scenario 3: Historical database of past executions contains application-feature-vectors as well as corresponding decisions (e.g., block 206 of FIG. 2)
  Confidence level of each decision rule (X→D) is measured using Equation (7) as conf(X→D)=Probability(D|X)

Referring next to block 216 of FIG. 2, all of the rules in all of the scenarios may be ranked by the rule prioritizer 136 as per their confidence levels in decreasing order and prioritized as per their ordering. In cases where multiple rules include the same priority, they may be considered together while applying priorities.

Referring next to block 218 of FIG. 2, with respect to application of decision rules 120, for example, the build versus buy decision rules, for application of prioritized rules, when a new build or buy advisory instance (e.g., the new tradeoff instance 140, as disclosed herein with reference to the artificial intelligence based health care example described below) is presented by the operating environment 146, the tradeoff resolver 138 may apply rules in priority order and present recommendations as per the following cases selected by the operating environment: $R_{true} \subseteq R_{all}$ may be specified as the set of rules, presidents of which hold for the new build or buy advisory instance. Further, for $R_{true} = R_{Build} + R_{Buy}$ where $R_{Build}$ is the subset of rules which imply Build and $R_{Buy}$ is the subset of rules implying Buy, the following cases may apply:

Case 1: Top recommendation
  Tradeoff resolver 138 identifies the rule in $R_{true}$ having highest priority and makes recommendation (e.g., the resolution 142) as specified by that rule.
Case 2: Expected Recommendation
  Let $p_i$ be the confidence level of the rule $r_i$
  Tradeoff resolver 138 estimates average confident-level across all those rules implying Build and Buy.

$$\theta = \sum_{r_i \in R_{true}} p_i$$

$$conf(\text{Build}) = \sum_{r_i \in R_{Build}} p_i/\theta$$

$$conf(\text{Buy}) = \sum_{r_i \in R_{Buy}} p_i/\theta$$

Tradeoff resolver 138 makes recommendations (Build and Buy) together with their expected confidence levels.

Referring next to block 220 of FIG. 2, continuous learning may involve adding a new application feature vector corresponding to the new instance to the historical data-set Δ, or if a decision is also known, then adding the application feature vector together with the decision as a new row to the application feature matrix 106. After this, all of the steps associated with blocks 204-216 in FIG. 2 are executed.

With respect to explanatory instance generation, for each new instance of build versus buy, the tradeoff resolver 138 may apply, for example, the k-nearest neighbor technique to identify most similar past instances, and present those to a user as plausible justifications (e.g., as shown in FIG. 6). Similarity between build or buy advisory instances may be determined as an additive inverse of the Euclidian distance between the application-feature-vectors corresponding to these instances.

Figure 5:
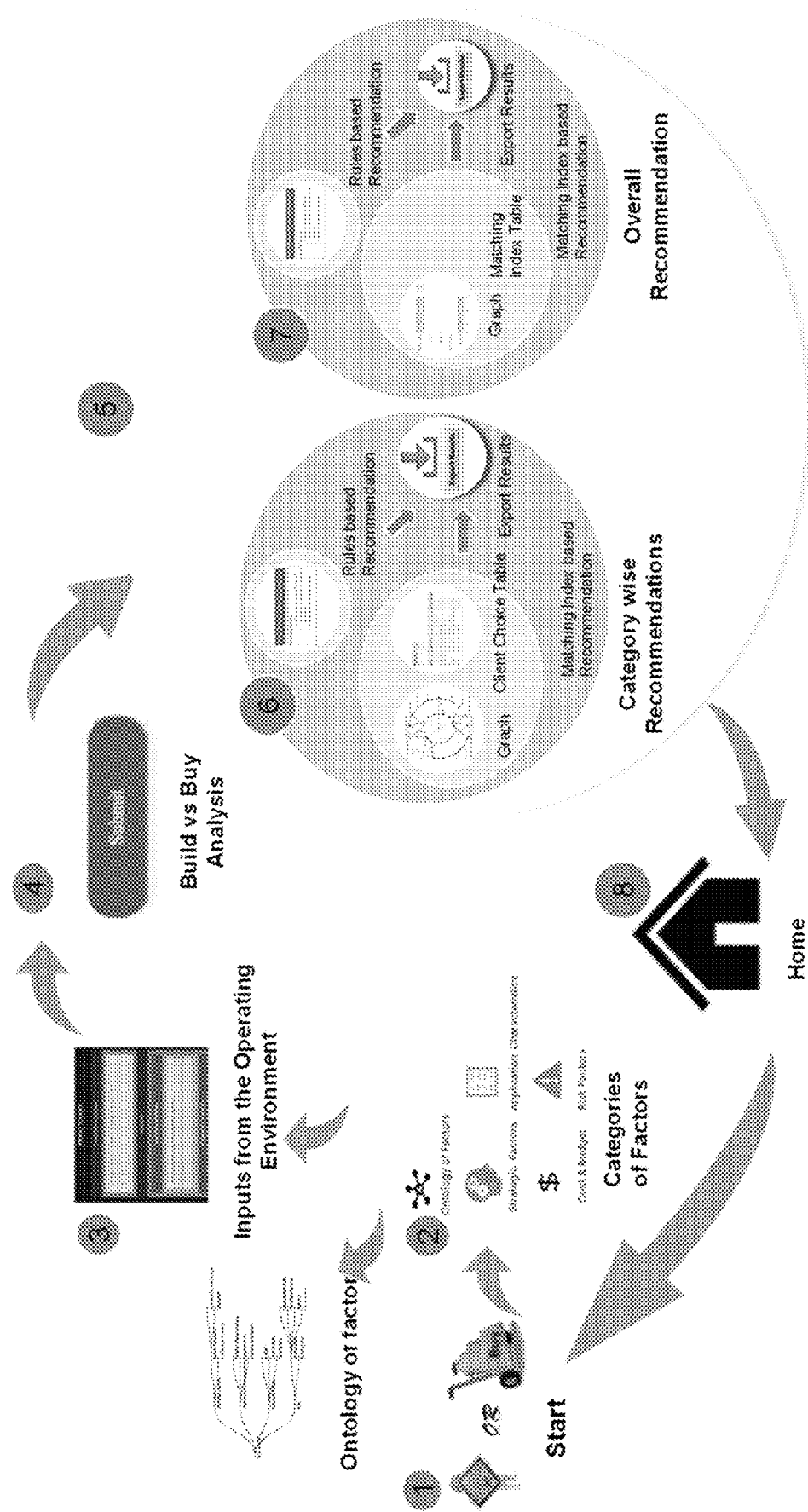
FIG. 5 illustrates an example layout to illustrate operation of the continuous learning-based application related trade-off resolution and implementation apparatus of FIG. 1 in accordance with an example of the present disclosure.

FIG. 5 illustrates an example layout to illustrate operation of the apparatus 100 in accordance with an example of the present disclosure.

With reference to FIG. 6, an illustrative example of an application 108 (e.g., a software application) for artificial intelligence based health care is shown. For a build or buy advisory instance, the example includes an application for online medical symptom check and recommendation.

For a hypothetical context of the example, a famous hospital for twenty years recently started receiving a large number of patients, and it stated that it has become difficult to manage the influx of patients as medical staff is limited. Management decided to adopt a virtual chatbot to give basic advice based on patient description and set an appointment if necessary, and in-turn schedule those appointments as per assessed severity level. The application 108 should be readily deployable, maintainable, customizable and highly secured for handling patient data.

Primary Considerations for the application 108 may include factors, reasons, and priority, respectively, as privacy, patient data should be handled very carefully and cannot be reused for any other purposes, and high. For the factor of security, reasons and priority may respectively include high level of data-security, and high. For the factor of cloud deployment, reasons and priority may respectively include deployability on private-cloud, and moderate. Further, for the factor of difficulty of workflow, reasons and priority may respectively include an existing workflow of the application 108 may be readily modifiable, and moderate.

With respect to buy options, an application such as BUOY HEALTH may be bought to perform the aforementioned processes. However, for this application, adding work flow or modulating workflow may be challenging with a relatively high expense to paid for the application. Further, data-privacy and security concerns may require legal guarantees.

With respect to buy considerations, such considerations may include data availability of symptoms for diseases, high level security and privacy of patient may be built with today's technology, and cloud deployment and training chatbot on the new application is feasible.

FIG. 6 illustrates overall recommendations (e.g., the resolution 142) associated with the apparatus 100 in accordance with an example of the present disclosure.

FIG. 7 illustrates features of an ontology of factors associated with the apparatus 100 in accordance with an example of the present disclosure.

With respect to FIG. 7, the ontology of factors may include a comprehensive listing of factors controlling build versus buy dynamics and their structured representation to facilitate detailed analysis and in identifying factors, which may be important in specific scenarios, but could have been missed if a decision had been based only upon subjective expertise. The ontological representation allows modeling of decision-parameters in a systematic manner, and also modeling of dependencies and trade-offs between parameters. Furthermore, the ontological representation may provide for continual injection and refinement of knowledge from the operating environment when new instances are considered over time. The ontological representation may also facilitate building of strategies as to how should an organization build or buy applications.

Referring to FIG. 7, the ontology of factors is shown as a tree. The ontology of factors may include, for example, measurable factors across four main categories of strategic factors, application characteristics, cost and budget, and risk factors described next.

With respect to strategic factors, such factors may capture strategic aspects under which build versus buy decision is being made in a specific application scenario. In particular, the strategic factors capture market-dynamics and intellectual property related aspects. Market dynamics may capture factors determining demand of application in market and controlling its behavior (e.g., competitive landscape, standards, governing standards, and organizational standards). Intellectual property may capture if an organization has a need to protect proprietary knowledge or information or data associated with the application (e.g., patents, trade secrets, and proprietary data).

With respect to application characteristics, such factors may capture various aspects related to the application including requirements, underlying technical problems, and availability of solutions in the market. Features associated with underlying technical problems or computational challenges may need to be solved in order to successfully design and implement the application. Often an application may have multiple technical problems which would be required to be solved to enable different features. Factors under application characteristics may be categorized as the below subtree:

Problem Characteristics
        Distinctiveness
    Complexity
    Requirements
        Business Requirements
            Variability
            Frequency of application upgrades
            Time to value
        Technical Requirements
            Dependencies
            Non-Functional Requirements
                Scalability
                Security
            Standard Compliance
            Potential for Reuse
            Technology obsolescence
    Solution Availability With respect to cost and budget, such factors may be considered as primary factors while deciding to buy or not, and if buying a ready to use application, then selecting among many competing vendors. Various factors contributing to costs of building an application and buying choices, and budgetary constraints may be considered. Various cost and budget factors may be organized as below:

Budget
        Type
        Estimate
    Cost to Build
        In-house Expertise
        Open Source Support
        Infrastructure Cost
        Build Team Cost
        Build Time and Effort Estimate
    Cost to Buy
        Type of Licensing
        Licensing Cost
        Deployment Cost
            Cloud Versus On-premise
        Maintenance Cost With respect to risk factors, various factors indicating risks of building an application and buying from a vendor may be considered. A subtree organizing various risks is as follows:

Buying Risks
        Requirement Risks
            Ambiguity
            Incompleteness
            Inconsistencies
            Infeasibility
        Workflow Control
            Flexibility of workflow
            Difficulty in Modifying Workflow Maturity
Vendor Risk
  Reputation
  Solution Completeness
  Reliability
  Support
  Exposure to Partners Market Risk
  Lack of Security Oversight
Building Risks
  Technical Deficit
  Opportunity Cost
  No Economies of Scale
    Schedule Risk Referring again to FIG. 1, the tradeoff implementer 144 may implement, with respect to the new tradeoff instance 140, the resolution 142 associated with the new tradeoff instance 140.

For the example of build versus buy for an application as disclosed herein, if the resolution 142 includes building an application, the tradeoff implementer 144 may implement design template generation. If the resolution 142 includes buying an application, the tradeoff implementer 144 may implement vendor selection.

Specifically, with respect to design template generation and vendor selection, the tradeoff resolver 138 may specify, for a new instance $\vec{x}$ of a build versus buy scenario, a recommendation to build with a confidence level of conf (Build|$\vec{x}$)>0.5, and buy with a confidence level of conf (Buy|$\vec{x}$)>0.5.

In order to determine the confidence levels of build versus buy, the tradeoff resolver 138 may determine similarity between $\vec{x}$ and past build versus buy instances as an additive inverse of the Euclidean distance between the application feature-vectors (AFVs) as follows:

$$\forall \vec{z} \in \Delta: Sim(\vec{x},\vec{z})=1-\sqrt{\Sigma_{i=1...n}(x_i-z_i)^2} \qquad \text{Equation (11)}$$

For Equation (11), $\vec{Z}$ is defined in Equation (3), and $\forall \vec{z}$ may mean 'for all z'.

The tradeoff resolver 138 may build a Degree-1 similarity network by first specifying $G_x=(V_x \cup \{n_x\}, E_x, wt)$ to be the Degree-1 similarity network for new application $\vec{x}$ with respect to historical instances. In this regard, $V_x$ may be specified as the set of nodes corresponding to all historical instances if build versus buy decisions were not known, and otherwise, as the set of nodes corresponding to the set of those applications for which decisions were to build. In addition, there is a node $n_x$ corresponding to $\vec{x}$. $E_x$ may represent the set of edges between nodes for new application $\vec{x}$ and all other nodes in $V_x$. Further, wt.: $E_x \aleph [0,1]$ may represent the weight function which associates weights with edges. These weights may be estimated as similarities between $\vec{x}$ and applications corresponding to $V_x$.

Figure 8:
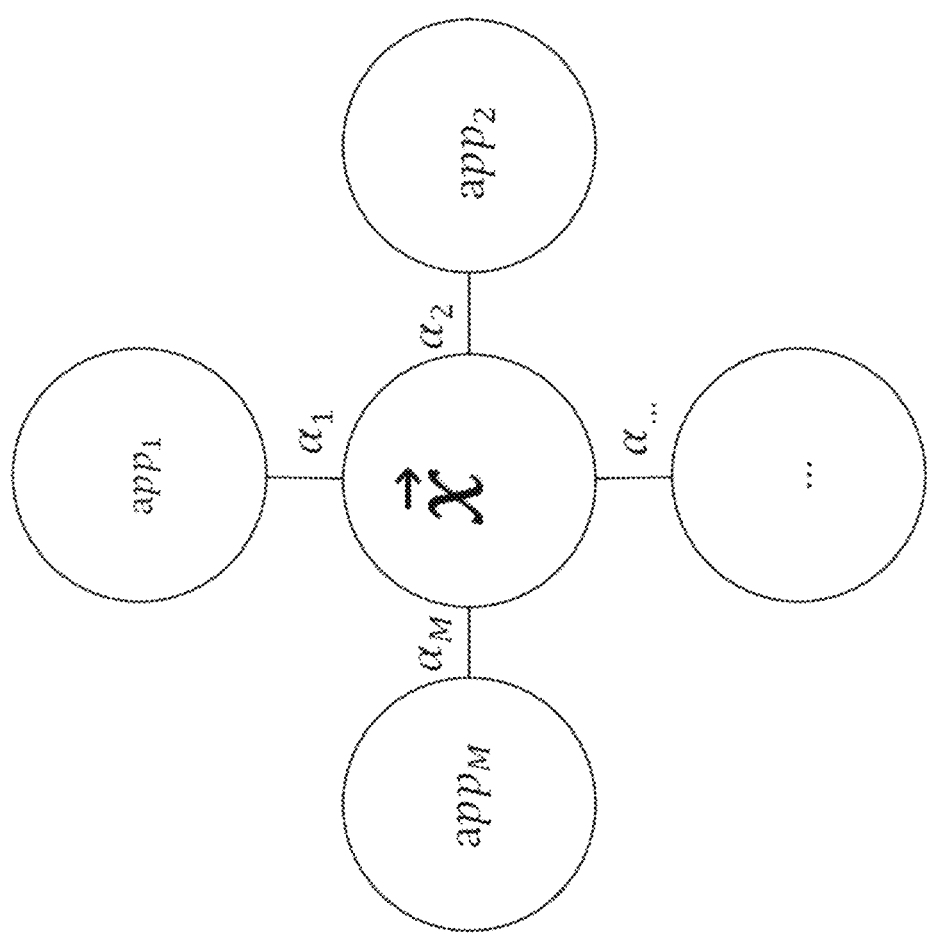
FIG. 8 illustrates a similarity network for build versus buy determination for the continuous learning-based application related trade-off resolution and implementation apparatus of FIG. 1 in accordance with an example of the present disclosure.

FIG. 8 illustrates a similarity network for build versus buy determination for the apparatus 100 in accordance with an example of the present disclosure.

For the similarity network of FIG. 8, weights may be determined as:

$$wt(\vec{x},app_1) = \alpha_1 = Sim(\vec{x},app1) \qquad \text{Equation (12)}$$
$$wt(\vec{x},app_2) = \alpha_2 = Sim(\vec{x},app_2),$$
$$...$$
$$wt(\vec{x},app_M) = \alpha_M = Sim(\vec{x},app_M)$$

Figure 9:
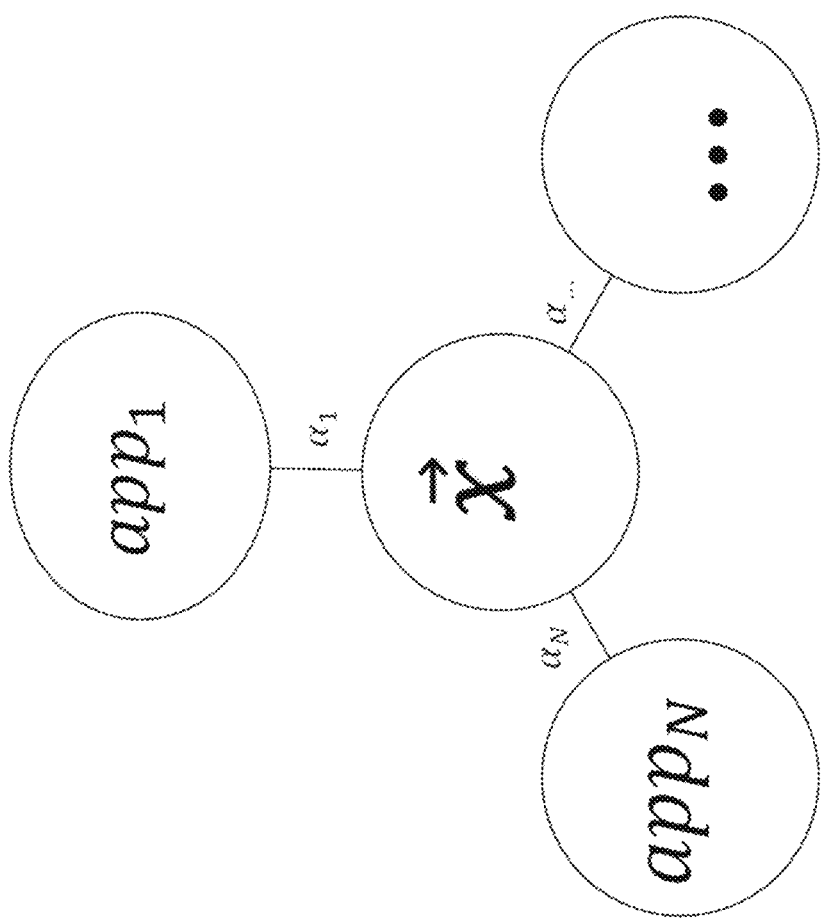
FIG. 9 illustrates a refined similarity network for build versus buy determination for the continuous learning-based application related trade-off resolution and implementation apparatus of FIG. 1 in accordance with an example of the present disclosure.

FIG. 9 illustrates a refined similarity network for build versus buy determination for the apparatus 100 in accordance with an example of the present disclosure.

Referring to FIG. 9, those vertices from the network $G_x$ having an edge weight less than a pre-defined threshold $\delta \in (0,1]$ (default=0.85) may be removed. In this regard $G_{x,\delta}=(V_{x,\delta} \cup \{n_x\}, E_{x,\delta}, wt_\delta)$ may be defined as the subgraph of $G_x$ after refinement.

Figure 10:
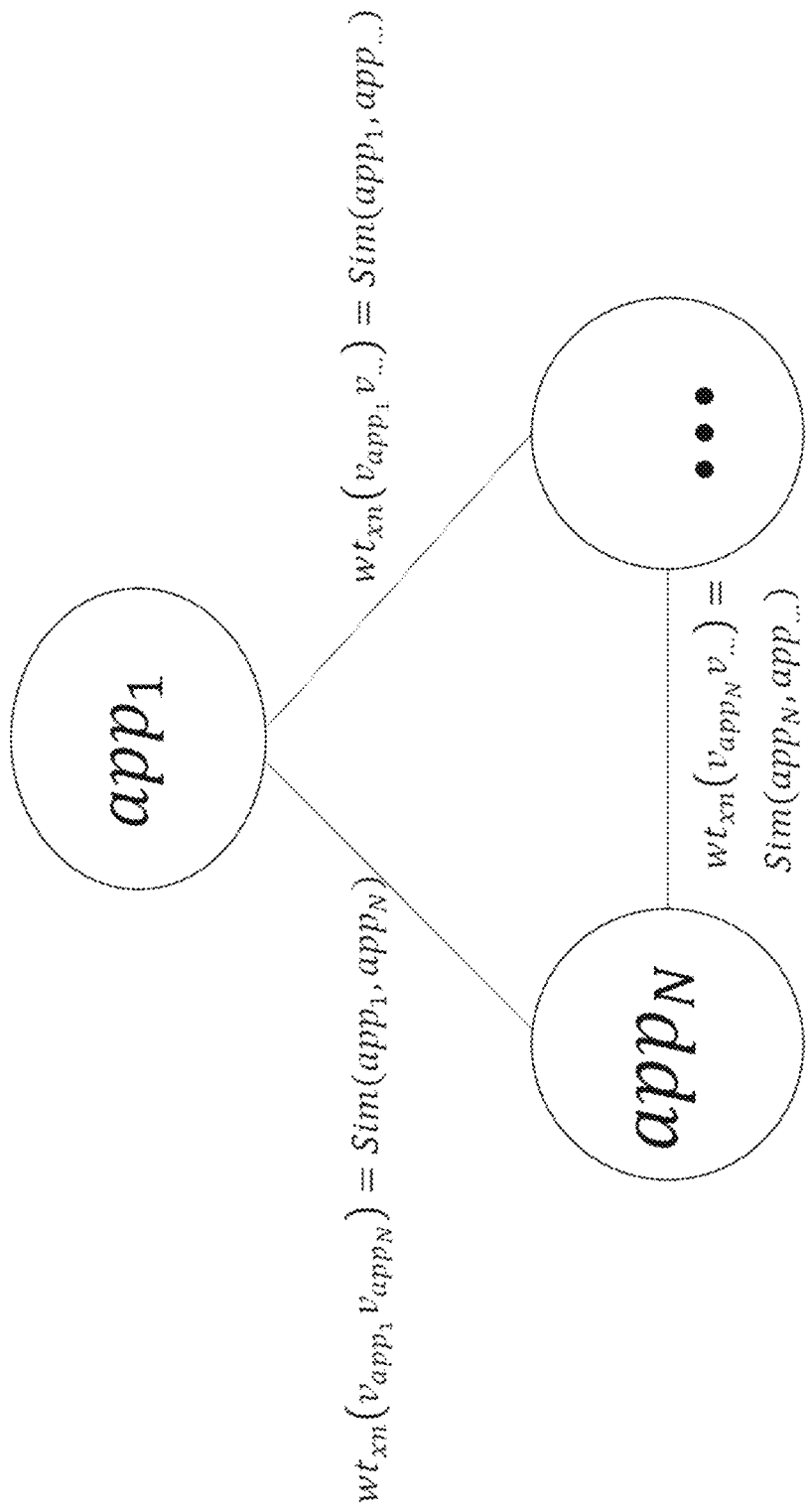
FIG. 10 illustrates a neighborhood graph for build versus buy determination for the continuous learning-based application related trade-off resolution and implementation apparatus of FIG. 1 in accordance with an example of the present disclosure.

FIG. 10 illustrates a neighborhood graph for build versus buy determination for the apparatus 100 in accordance with an example of the present disclosure.

Referring to FIG. 10, the tradeoff resolver 138 may generate a neighborhood graph among neighbors of $\vec{x}$ corresponding to the refined graph $G_{x,\delta}$. In this regard, $G_{xn}=(V_{xn}, E_{xn}, wt_{xn})$ may be specified as the neighborhood graph such that:

$$V_{xn}=V_{x,\delta}// \text{ Excluding central node } n_x$$

$$E_{xn}=\{(y,z)|y,z \in V_{x,\delta} \text{ AND } y \neq z\}$$

$$wt_{xn}: E_{xn} \mapsto [0,1] \text{ estimated as } wt_{xn}(y,z)= Sim(app_y,app_z) \qquad \text{Equation (13)}$$

In this regard, $app_y$ and $app_z$ may represent applications corresponding to nodes y, z respectively.

With respect to refining of the neighborhood network, the tradeoff resolver 138 may remove those edges from $G_{xn}$ having an edge weight less than the threshold $\delta$. In this regard, $G_{xn}=(V_{xn,\delta}, E_{xn,\delta}, wt_{\delta n})$ may be specified as the subgraph of $G_{xn}$ after refinement such that:

$$\forall (Z,Z') \in E_{xn,\delta}: wt_{\delta n}(Z,Z') \geq \delta \qquad \text{Equation (14)}$$

If as a results of Equation (14), there are nodes which are not connected to any other nodes, these nodes may be removed.

With respect to neighborhood clique identification, a clique may represent a (sub)graph in which all the nodes are connected to each other. A maximal clique may be described as a clique which is not a subgraph of any other clique. The tradeoff resolver 138 may identify all maximal cliques in the refined neighbor graph $G_{xn,\delta}$, and specify $\psi$ to be the list of these cliques ranged over by cl, where cl is a variable representing cliques which are grouped under the set $\psi$.

With respect identification of strongest neighborhood clique, the tradeoff resolver 138 may measure mean edge weights of all the cliques in $\psi$ as follows:

$$\forall cl \in \Psi: wt(cl)=\text{mean}(\{wt_{\delta n}(Z,Z')|(Z,Z')|(Z,Z') \in cl\}) \qquad \text{Equation (15)}$$

In this regard, wt(cl) may be used to measure how similar are applications which are also similar to the new application $\vec{x}$. The tradeoff resolver 138 may select the clique $cl_{max}$ with maximum mean edge weight. This clique may represent the set of applications that are strongly similar to the new application as well as among themselves.

With respect to design template generation, for each application corresponding to the nodes in the $cl_{max}$, the tradeoff implementer 144 may extract information such as structural diagrams of the application that include component diagrams, and class diagrams, and list of application programming interfaces associated with each node in these structural diagrams.

Figure 11:
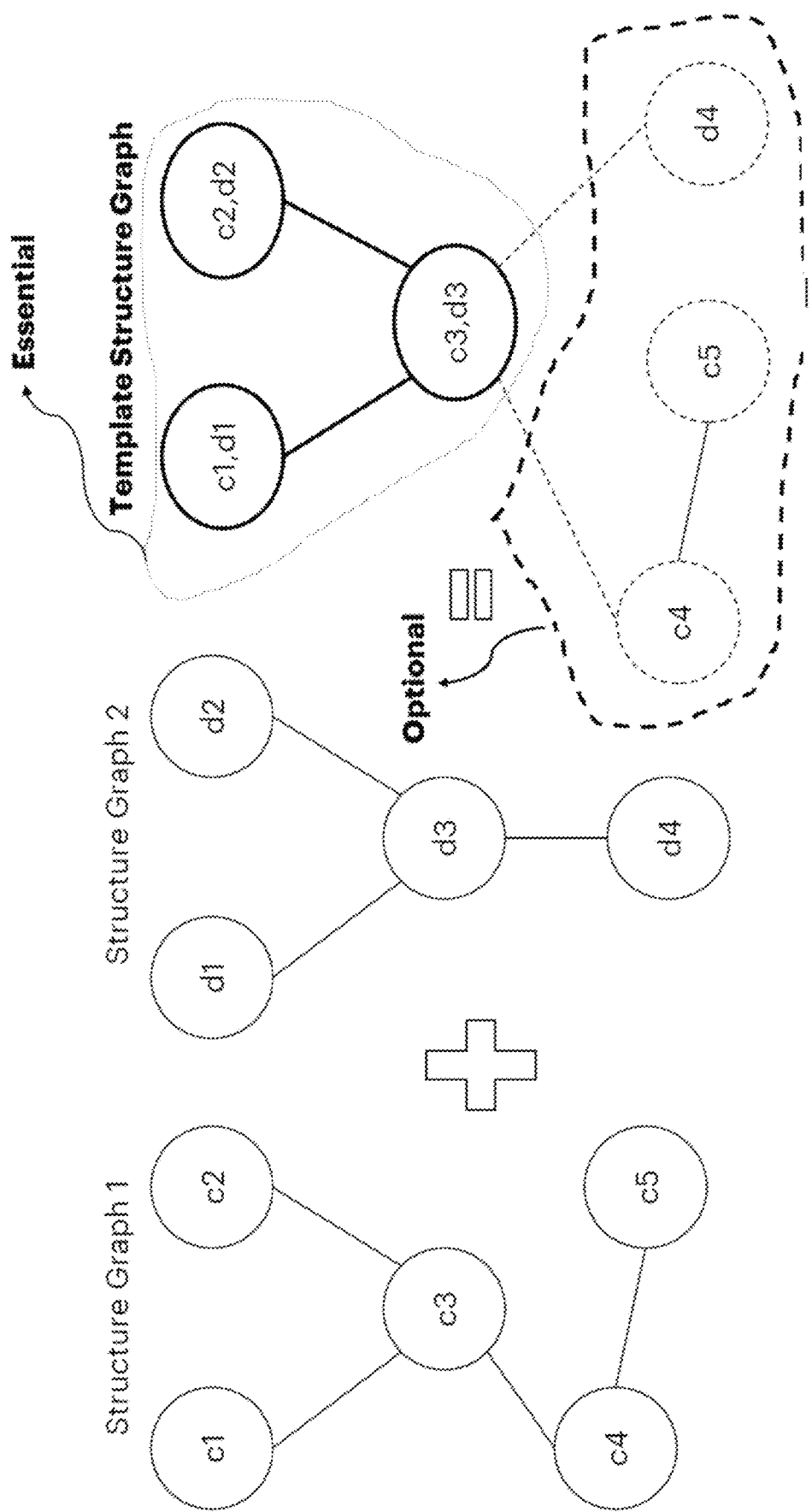
FIG. 11 illustrates structural graphs for build versus buy determination for the continuous learning-based application related trade-off resolution and implementation apparatus of FIG. 1 in accordance with an example of the present disclosure.

FIG. 11 illustrates structural graphs for build versus buy determination for the apparatus 100 in accordance with an example of the present disclosure.

Referring to FIG. 11, the tradeoff implementer 144 may combine structural graphs. In this regard, based upon the pure structure of these diagrams (e.g., ignoring names of the components), the tradeoff implementer 144 may create a structural design template for the new application using the combination of these graphs. In this regard, with respect to essential components, the tradeoff implementer 144 may identify common subgraphs in the structural diagrams of all of these applications, and designate these components as essential. With respect to optional components, the tradeoff implementer 144 may consider all other components from these graphs as optional, and these optional components may be joined to the essential components using edges designated as optional edges.

With respect to vendor selection for buying an application, the tradeoff implementer 144 may specify the set of applications corresponding to the nodes in $cl_{max}$ be $\Theta = \{app_{x1}, app_{x2}, \ldots, app_{xL}\}$, where L is the size of the clique $cl_{max}$. For each of the applications in the set $\Theta$, the tradeoff implementer 144 may extract the following information from a historical database:

$$\{(\aleph_{x1}, \alpha_{x1}), \ldots, (\aleph_{xL}, \alpha_{xL})\}$$

where ($\forall i: 1 \ldots L$)

$\aleph_{xi}$: vendor for application $app_{xi}$ $\alpha_{xi}$: similarity of application $app_{xi}$ with $\vec{x}$     Equation (16)

The tradeoff implementer 144 may sort a set of vendors $\{\aleph_{x1}, \ldots, \aleph_{xL}\}$ as per their corresponding similarities. In this regard, the tradeoff implementer 144 may specify $\{\aleph_{x1}, \ldots, \aleph_{xL}\}$ as the list of reordered vendors such that:

$$\alpha_{j_1} = \max\{\alpha_{x1}, \ldots, \alpha_{xL}\} \geq \alpha_{xj_2} \geq \ldots \geq \alpha_{xj_L} \quad \text{Equation (17)}$$

From Equation (17), the tradeoff implementer 144 may select top k vendors to buy the application corresponding to new scenario $\vec{x}$ as follows:

$\aleph_{xj_1}$: 1$^{st}$ vendor preference to buy application for scenario $\vec{x}$     Equation (18)

$\aleph_{xj_2}$: 2$^{nd}$ vendor preference to buy application for scenario $\vec{x}$

...

Figure 12:
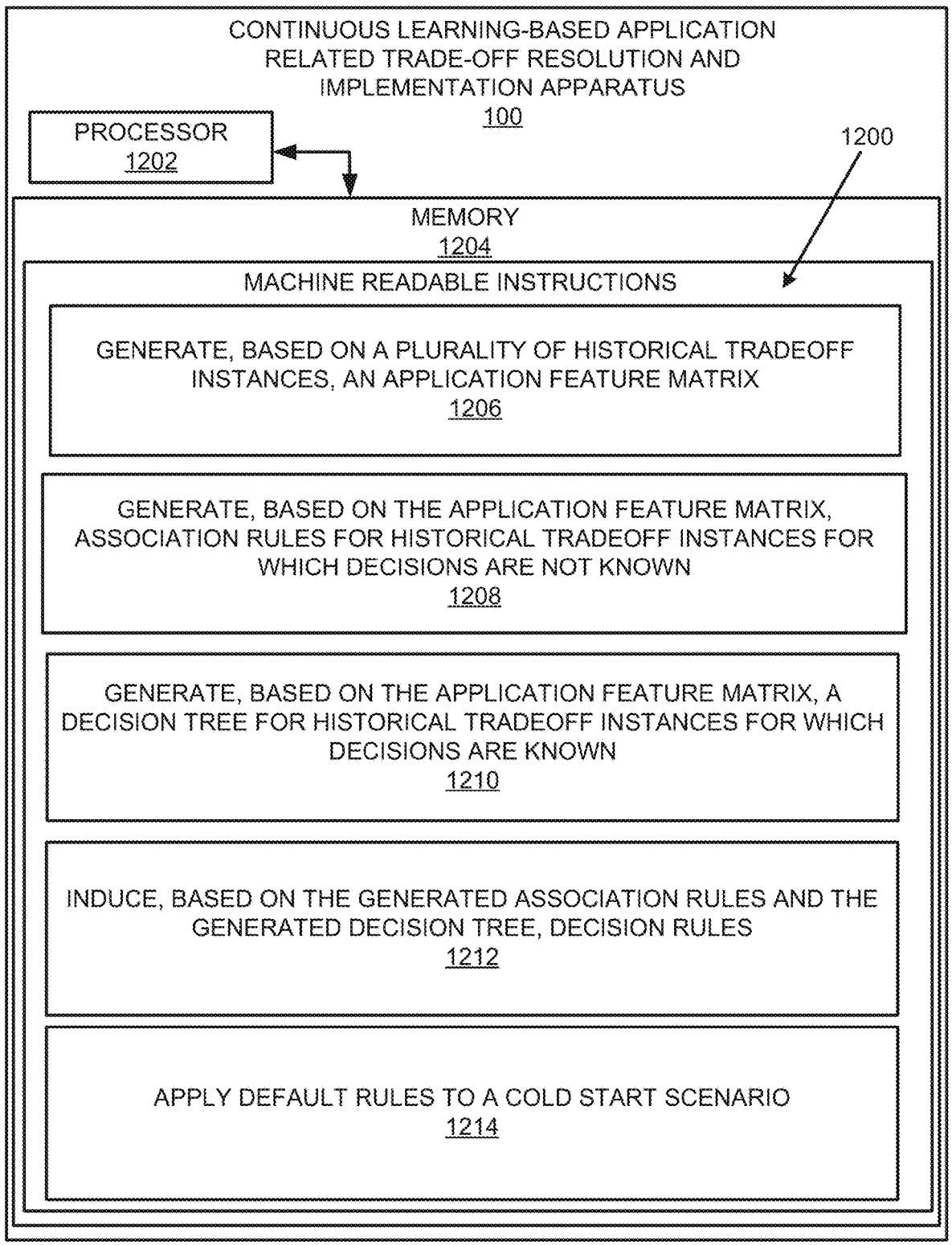
FIG. 12 illustrates an example block diagram for continuous learning-based application related trade-off resolution and implementation in accordance with an example of the present disclosure.
Figure 12:
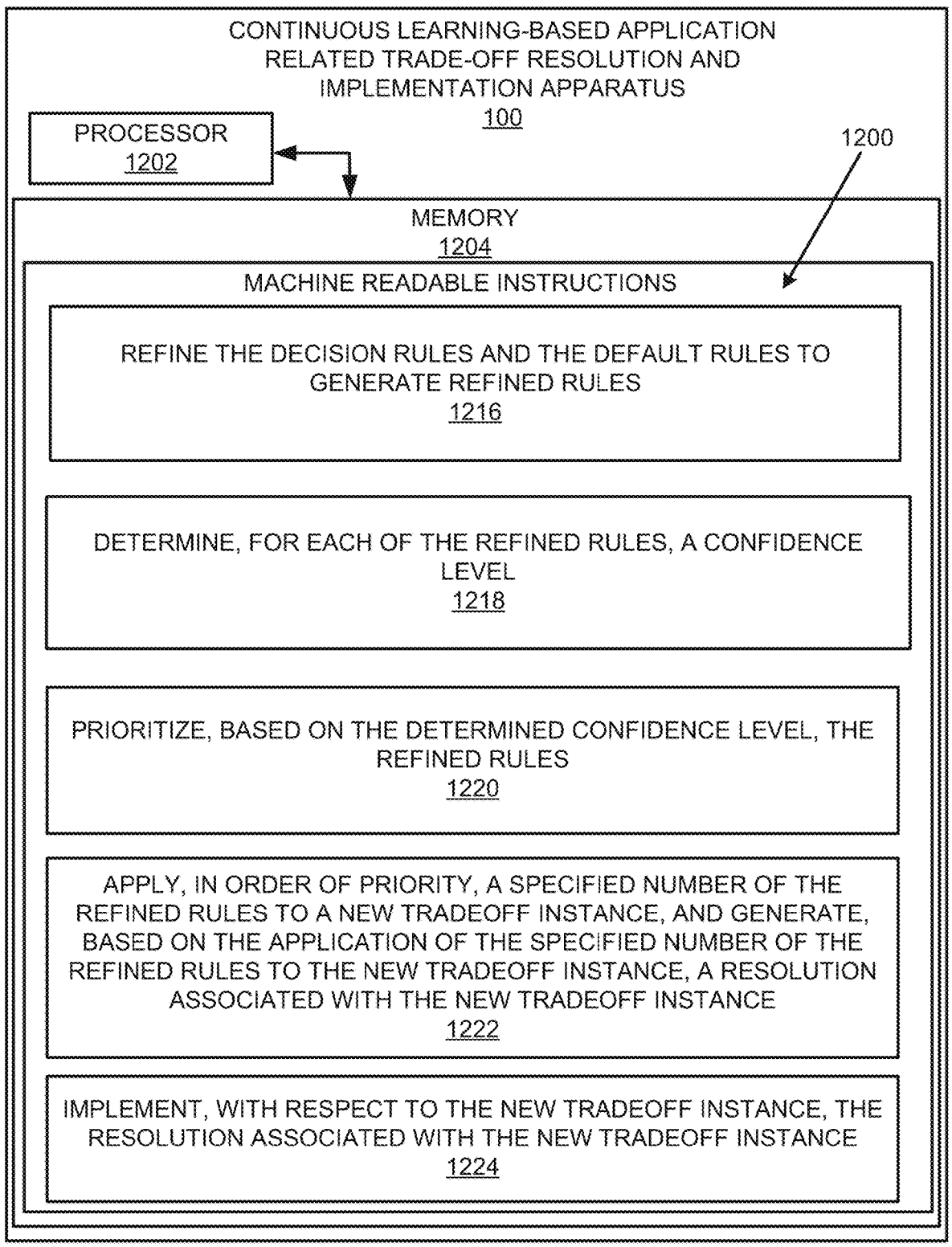
Figure 13:
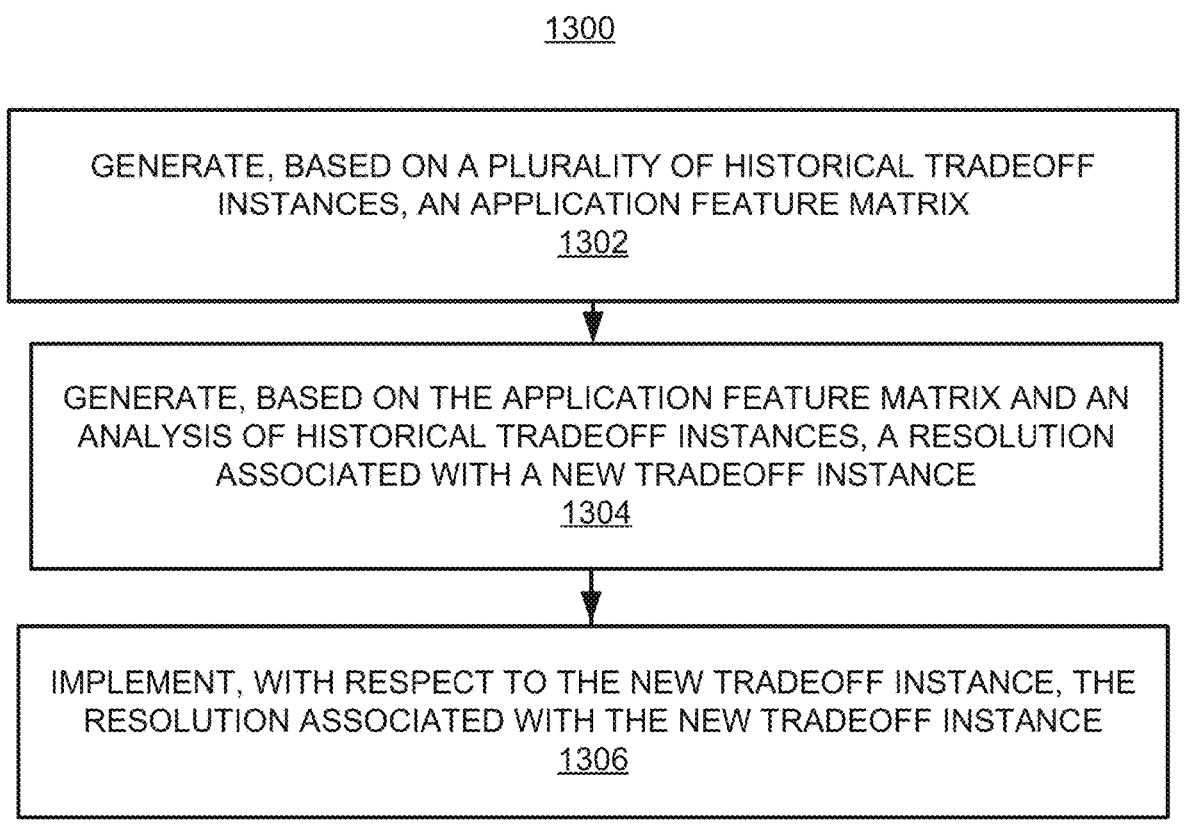
FIG. 13 illustrates a flowchart of an example method for continuous learning-based application related trade-off resolution and implementation in accordance with an example of the present disclosure.
Figure 14:
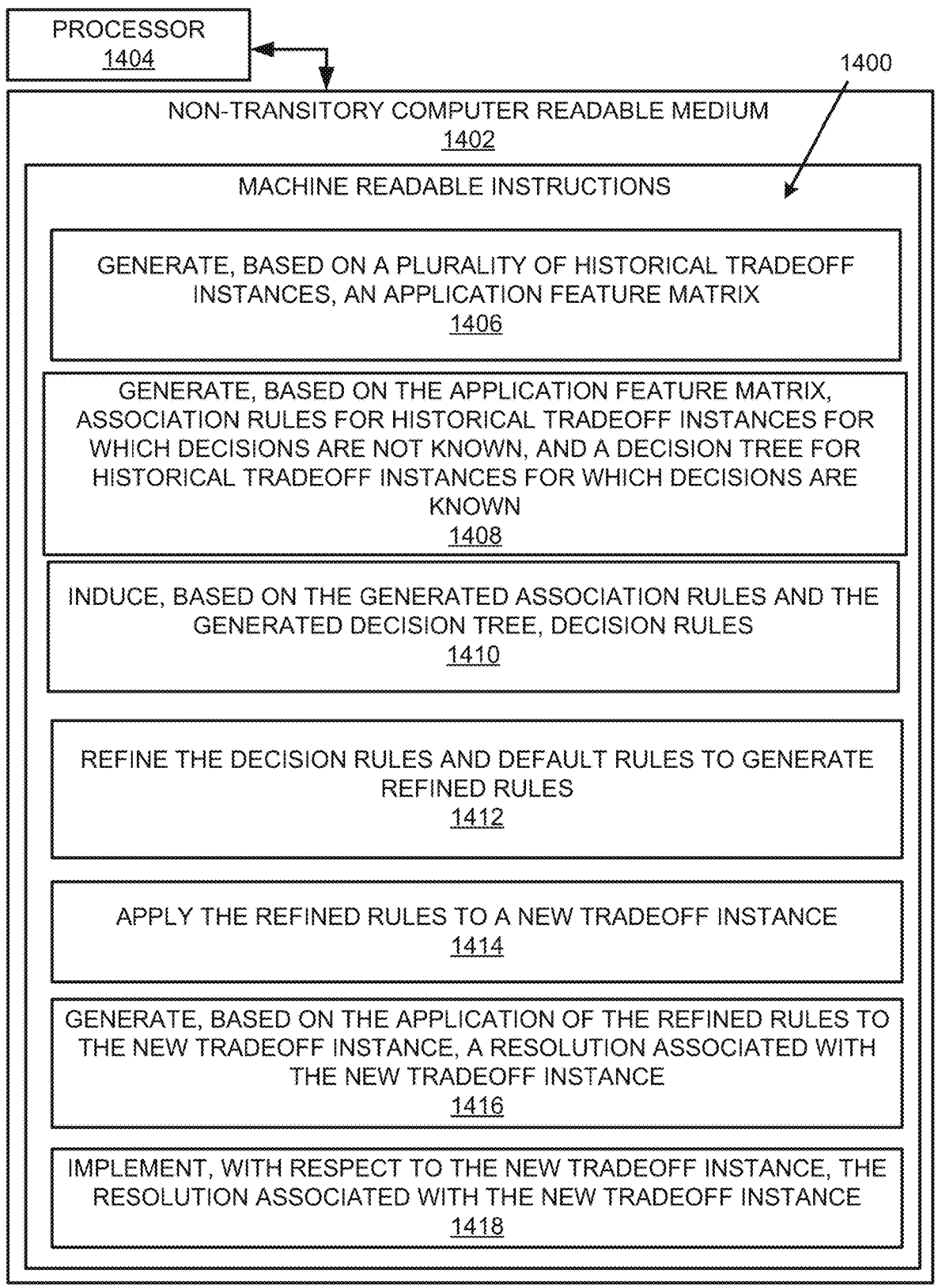
FIG. 14 illustrates a further example block diagram for continuous learning-based application related trade-off resolution and implementation in accordance with another example of the present disclosure.

$\aleph_{xj_k}$: k$^{th}$ vendor preference to buy application for scenario $\vec{x}$ FIGS. 12-14 respectively illustrate an example block diagram 1200, a flowchart of an example method 1300, and a further example block diagram 1400 for continuous learning-based application related trade-off resolution and implementation, according to examples. The block diagram 1200, the method 1300, and the block diagram 1400 may be implemented on the apparatus 100 described above with reference to FIG. 1 by way of example and not of limitation. The block diagram 1200, the method 1300, and the block diagram 1400 may be practiced in other apparatus. In addition to showing the block diagram 1200, FIG. 12 shows hardware of the apparatus 100 that may execute the instructions of the block diagram 1200. The hardware may include a processor 1202, and a memory 1204 storing machine-readable instructions that when executed by the processor cause the processor to perform the instructions of the block diagram 1200. The memory 1204 may represent a non-transitory computer readable medium. FIG. 13 may represent an example method for continuous learning-based application related trade-off resolution and implementation, and the steps of the method. FIG. 14 may represent a non-transitory computer readable medium 1402 having stored thereon machine-readable instructions to provide continuous learning-based application related trade-off resolution and implementation according to an example. The machine-readable instructions, when executed, cause a processor 1404 to perform the instructions of the block diagram 1400 also shown in FIG. 14.

The processor 1202 of FIG. 12 and/or the processor 1404 of FIG. 14 may include a single or multiple processors or other hardware processing circuit, to execute the methods, functions and other processes described herein. These methods, functions and other processes may be embodied as machine-readable instructions stored on a computer readable medium, which may be non-transitory (e.g., the non-transitory computer readable medium 1402 of FIG. 14), such as hardware storage devices (e.g., RAM (random access memory), ROM (read only memory), EPROM (erasable, programmable ROM), EEPROM (electrically erasable, programmable ROM), hard drives, and flash memory). The memory 1204 may include a RAM, where the machine-readable instructions and data for a processor may reside during runtime.

Referring to FIGS. 1-12, and particularly to the block diagram 1200 shown in FIG. 12, the memory 1204 may include instructions 1206 to generate, based on a plurality of historical tradeoff instances 104, an application feature matrix 106 for an application 108.

The processor 1202 may fetch, decode, and execute the instructions 1208 to generate, based on the application feature matrix 106, association rules 112 for historical tradeoff instances for which decisions are not known.

The processor 1202 may fetch, decode, and execute the instructions 1210 to generate, based on the application feature matrix 106, a decision tree 116 for historical tradeoff instances for which decisions are known.

The processor 1202 may fetch, decode, and execute the instructions 1212 to induce, based on the generated association rules 112 and the generated decision tree 116, decision rules 120.

The processor 1202 may fetch, decode, and execute the instructions 1214 to apply default rules 124 to a cold start scenario 126.

The processor 1202 may fetch, decode, and execute the instructions 1216 to refine the decision rules 120 and the default rules 124 to generate refined rules 130.

The processor 1202 may fetch, decode, and execute the instructions 1218 to determine, for each of the refined rules 130, a confidence level 134.

The processor 1202 may fetch, decode, and execute the instructions 1220 to prioritize, based on the determined confidence level 134, the refined rules 130.

The processor 1202 may fetch, decode, and execute the instructions 1222 to apply, in order of priority, a specified number of the refined rules to a new tradeoff instance 140, and generate, based on the application of the specified number of the refined rules to the new tradeoff instance 140, a resolution 142 associated with the new tradeoff instance 140.

The processor 1202 may fetch, decode, and execute the instructions 1224 to implement, with respect to the new tradeoff instance 140, the resolution 142 associated with the new tradeoff instance 140.

Referring to FIGS. 1-11 and 13, and particularly FIG. 13, for the method 1300, at block 1302, the method may include generating, based on a plurality of historical tradeoff instances 104, an application feature matrix 106.

At block 1304, the method may include generating, based on the application feature matrix 106 and an analysis of historical tradeoff instances, a resolution associated with a new tradeoff instance.

At block 1306, the method may include implementing, with respect to the new tradeoff instance 140, the resolution 142 associated with the new tradeoff instance 140.

Referring to FIGS. 1-11 and 14, and particularly FIG. 14, for the block diagram 1400, the non-transitory computer readable medium 1402 may include instructions 1406 to generate, based on a plurality of historical tradeoff instances 104, an application feature matrix 106 for an application 108.

The processor 1404 may fetch, decode, and execute the instructions 1408 to generate, based on the application feature matrix 106, association rules 112 for historical tradeoff instances for which decisions are not known, and a decision tree 116 for historical tradeoff instances for which decisions are known.

The processor 1404 may fetch, decode, and execute the instructions 1410 to induce, based on the generated association rules 112 and the generated decision tree 116, decision rules 120.

The processor 1404 may fetch, decode, and execute the instructions 1412 to refine the decision rules 120 and the default rules 124 to generate refined rules 130.

The processor 1404 may fetch, decode, and execute the instructions 1414 to apply the refined rules to a new tradeoff instance 140.

The processor 1404 may fetch, decode, and execute the instructions 1416 to generate, based on the application of the refined rules to the new tradeoff instance 140, a resolution 142 associated with the new tradeoff instance 140.

The processor 1404 may fetch, decode, and execute the instructions 1418 to implement, with respect to the new tradeoff instance 140, the resolution 142 associated with the new tradeoff instance 140.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A continuous learning-based application related tradeoff resolution and implementation apparatus comprising:
   at least one hardware processor;
   an application feature matrix generator, executed by the at least one hardware processor, to
      generate, based on a plurality of historical tradeoff instances, an application feature matrix;
   an association rule generator, executed by the at least one hardware processor, to
      generate, based on the application feature matrix, association rules for historical tradeoff instances of the plurality of historical tradeoff instances for which decisions are not known;
   a decision tree generator, executed by the at least one hardware processor, to
      generate, based on the application feature matrix, a decision tree for historical tradeoff instances of the plurality of historical tradeoff instances for which decisions are known;
   a rule inducer, executed by the at least one hardware processor, to
      induce, based on the generated association rules and the generated decision tree, decision rules;
   a cold start controller, executed by the at least one hardware processor, to
      apply default rules to a cold start scenario;
   a rule refiner, executed by the at least one hardware processor, to
      refine the decision rules and the default rules to generate refined rules;
   a confidence level analyzer, executed by the at least one hardware processor, to
      determine, for each of the refined rules, a confidence level;
   a rule prioritizer, executed by the at least one hardware processor, to
      prioritize, based on the determined confidence level, the refined rules;
   a tradeoff resolver, executed by the at least one hardware processor, to
      apply, in order of priority from the prioritization of the refined rules, a specified number of the refined rules to a new tradeoff instance, and
      generate, based on the application of the specified number of the refined rules to the new tradeoff instance, a resolution associated with the new tradeoff instance; and
   a tradeoff implementer, executed by the at least one hardware processor, to
      implement, with respect to the new tradeoff instance, the resolution associated with the new tradeoff instance, wherein the resolution associated with the new tradeoff instance includes build versus buy options for a new application and implementing the resolution includes:
         determining confidence levels associated with the build versus buy options for the resolution;
         enabling automatic selection of one of the build versus buy options having a higher confidence level from the determined confidence levels,
      wherein if the build option is selected,
         building the application by selecting application programming interfaces (APIs) matching functional requirements of the application and integrating the APIs as per templatized design architecture, and
      wherein if the buy option is selected,
         automatically selecting a vendor for purchasing the application.

2. The continuous learning-based application related trade-off resolution and implementation apparatus according to claim 1, wherein
   the application feature matrix generator is executed by the at least one hardware processor to:
      generate application feature vectors based on interactions with an operating environment; and the association rule generator is executed by the at least one hardware processor to
generate, based on the application feature vectors, the association rules for historical tradeoff instances of the plurality of historical tradeoff instances for which decisions are not known.

3. The continuous learning-based application related trade-off resolution and implementation apparatus according to claim 1, wherein the rule refiner is executed by the at least one hardware processor to refine the decision rules and the default rules to generate the refined rules by:
performing rule unification to refine the decision rules and the default rules by eliminating redundancies to generate the refined rules.

4. The continuous learning-based application related trade-off resolution and implementation apparatus according to claim 1, wherein the application feature matrix generator is executed by at least one hardware processor to:
update, based on the plurality of historical tradeoff instances and the resolution associated with the new tradeoff instance, the application feature matrix.

5. The continuous learning-based application related trade-off resolution and implementation apparatus according to claim 1, wherein the tradeoff implementer is executed by the at least one hardware processor to implement, with respect to the new tradeoff instance that includes the build versus buy option for the new application, the resolution that includes building the new application by:
generating a design template for the new application.

6. The continuous learning-based application related trade-off resolution and implementation apparatus according to claim 1, wherein the application feature matrix includes build versus buy instances represented by application feature vectors as class labels together with corresponding decisions.

7. A method for continuous learning-based application related trade-off resolution and implementation, the method comprising:
generating, by at least one hardware processor, based on a plurality of historical tradeoff instances, an application feature matrix;
generating, by the at least one hardware processor, based on the application feature matrix, association rules for historical tradeoff instances of the plurality of historical tradeoff instances for which decisions are not known;
generating, by the at least one hardware processor based on the application feature matrix, a decision tree for historical tradeoff instances of the plurality of historical tradeoff instances for which decisions are known;
inducing, by the at least one hardware processor based on the generated association rules and the generated decision tree, decision rules;
applying, by the at least one hardware processor, default rules to a cold start scenario;
generating, by the at least one hardware processor, refined rules by refining the decision rules and the default rules;
determining, by the at least one hardware processor, for each of the refined rules, a confidence level;
prioritizing, by the at least one hardware processor, based on the determined confidence level, the refined rules;
applying, by the at least one hardware processor, in order of priority from the prioritization of the refined rules, a specified number of the refined rules to a new tradeoff instance;
generating, by the at least one hardware processor, based on the application of the specified number of the refined rules to the new tradeoff instance, a resolution associated with the new tradeoff instance; and
implementing, by the at least one hardware processor, with respect to the new tradeoff instance, the resolution associated with the new tradeoff instance includes build versus buy options for a new application;
determining, by the at least one hardware processor, confidence levels associated with the build versus buy options for the resolution; and
enabling, by the at least one hardware processor, automatic selection of one of the build versus buy options having a higher confidence level from the determined confidence levels, wherein if the build option is selected,
building the application by selecting application programming interfaces (APIs) matching functional requirements of the application and integrating the APIs as per templatized design architecture,
wherein if the buy option is selected,
automatically selecting a vendor for purchasing the application.

8. A non-transitory computer readable medium having stored thereon machine-readable instructions, the machine-readable instructions, when executed by at least one hardware processor, cause the at least one hardware processor to:
generate, based on a plurality of historical tradeoff instances, an application feature matrix;
generate, based on the application feature matrix,
association rules for historical tradeoff instances of the plurality of historical tradeoff instances for which decisions are not known, and
a decision tree for historical tradeoff instances of the plurality of historical tradeoff instances for which decisions are known;
induce, based on the generated association rules and the generated decision tree, decision rules;
apply default rules to a cold start scenario;
refine the decision rules and default rules to generate refined rules;
determine, for each of the refined rules, a confidence level;
prioritize, based on the determined confidence level, the refined rules;
apply, in order of priority from the prioritization of the refined rules, a specified number of the refined rules to a new tradeoff instance;
generate, based on the application of the refined rules to the new tradeoff instance, a resolution associated with the new tradeoff instance; and
implement, with respect to the new tradeoff instance, the resolution associated with the new tradeoff instance, wherein the resolution associated with the new tradeoff instance includes build versus buy options for a new application and implementing the resolution includes:
determining confidence levels associated with the build versus buy options for the resolution;
enabling automatic selection of one of the build versus buy options having a higher confidence level from the determined confidence levels,
wherein if the build option is selected,
building the application by selecting application programming interfaces (APIs) matching functional requirements of the application and integrating the APIs as per templatized design architecture, and
wherein if the buy option is selected,
automatically selecting a vendor for purchasing the application.

* * * * *